United States Patent [19]

Cushing

[11] 4,130,879

[45] Dec. 19, 1978

[54] APPARATUS FOR PERFORMING FLOATING POINT ARITHMETIC OPERATIONS USING SUBMULTIPLE STORAGE

[75] Inventor: David E. Cushing, Chelmsford, Mass.

[73] Assignee: Honeywell Information Systems Inc., Waltham, Mass.

[21] Appl. No.: 815,891

[22] Filed: Jul. 15, 1977

[51] Int. Cl.$^2$ ............................................. G06F 7/52
[52] U.S. Cl. ..................................... 364/748; 364/760
[58] Field of Search ............................... 364/748, 760

[56] References Cited

U.S. PATENT DOCUMENTS

| | | | |
|---|---|---|---|
| 3,372,269 | 3/1968 | MacSorley et al. | 364/760 |
| 3,730,425 | 5/1973 | Kindell et al. | 364/760 |
| 3,871,578 | 3/1975 | Van de Goor et al. | 364/748 |
| 4,041,292 | 8/1977 | Kindell | 364/760 |

*Primary Examiner*—Jerry Smith
*Attorney, Agent, or Firm*—Faith F. Driscoll; Nicholas Prasinos; Ronald T. Reiling

[57] ABSTRACT

A scientific processing unit includes apparatus for performing floating point multiplication operations with operands in binary coded form. The apparatus is constructed from standard multibit LSI microprocessor chips organized into a number of vertical slices. Each chip includes an arithmetic logic unit (ALU) and a random access memory (RAM). The ALU's are used to generate a predetermined number of submultiples of a mantissa portion of a floating point number which are stored in the chips memories. The submultiples are generated by multiplying the mantissa by predetermined factors which correspond to the values of multiplier digit positions selected during the multiplication operation.

The apparatus further includes selection circuits which provide for selection of the least significant bit positions from each of a number of groups of multiplier digits during the multiplication operation. The least significant bit positions selected are used to read out the entire submultiple from the chip memories which thereafter are summed to produce a final product.

36 Claims, 11 Drawing Figures

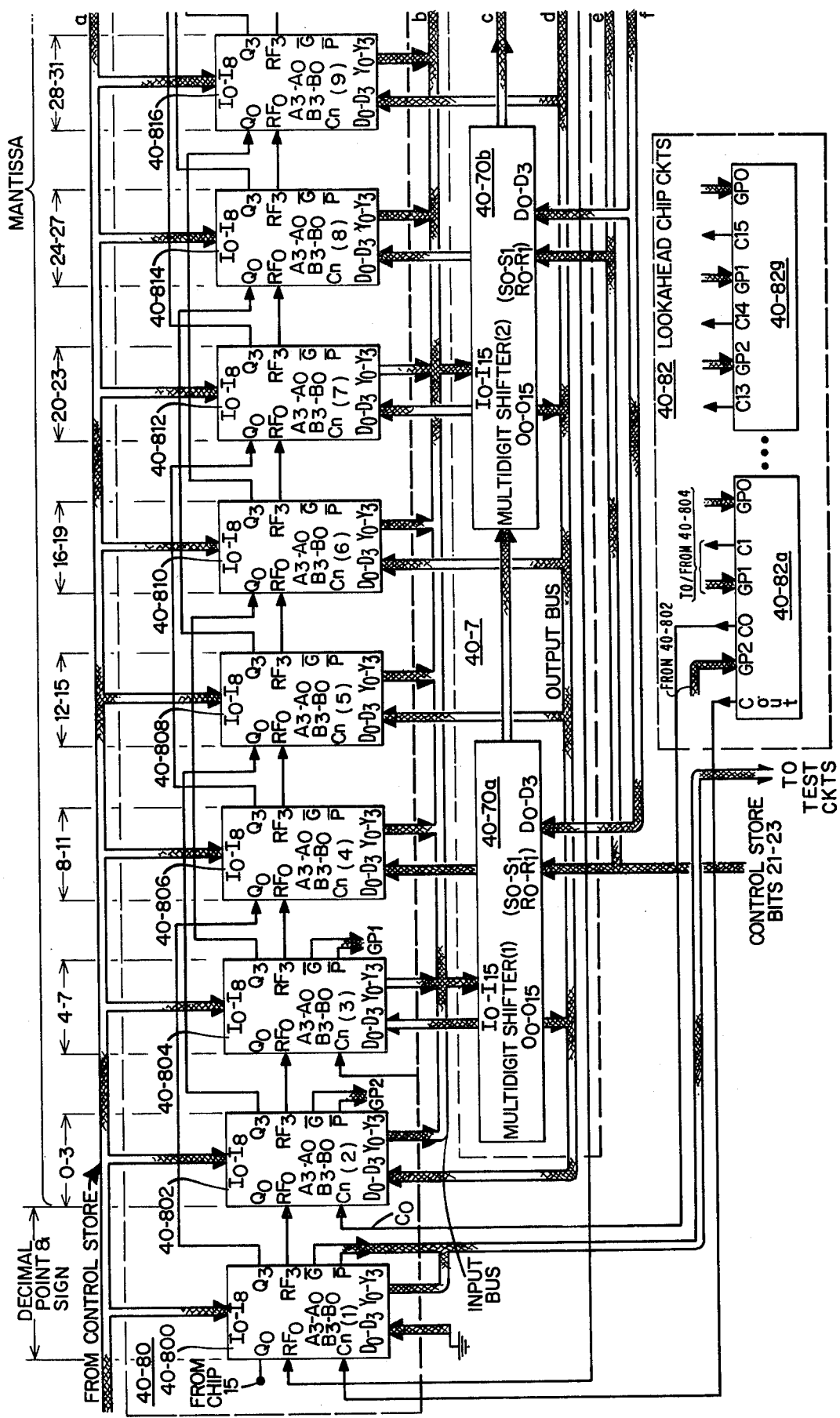
Fig. 3 (sheet 1 of 2).

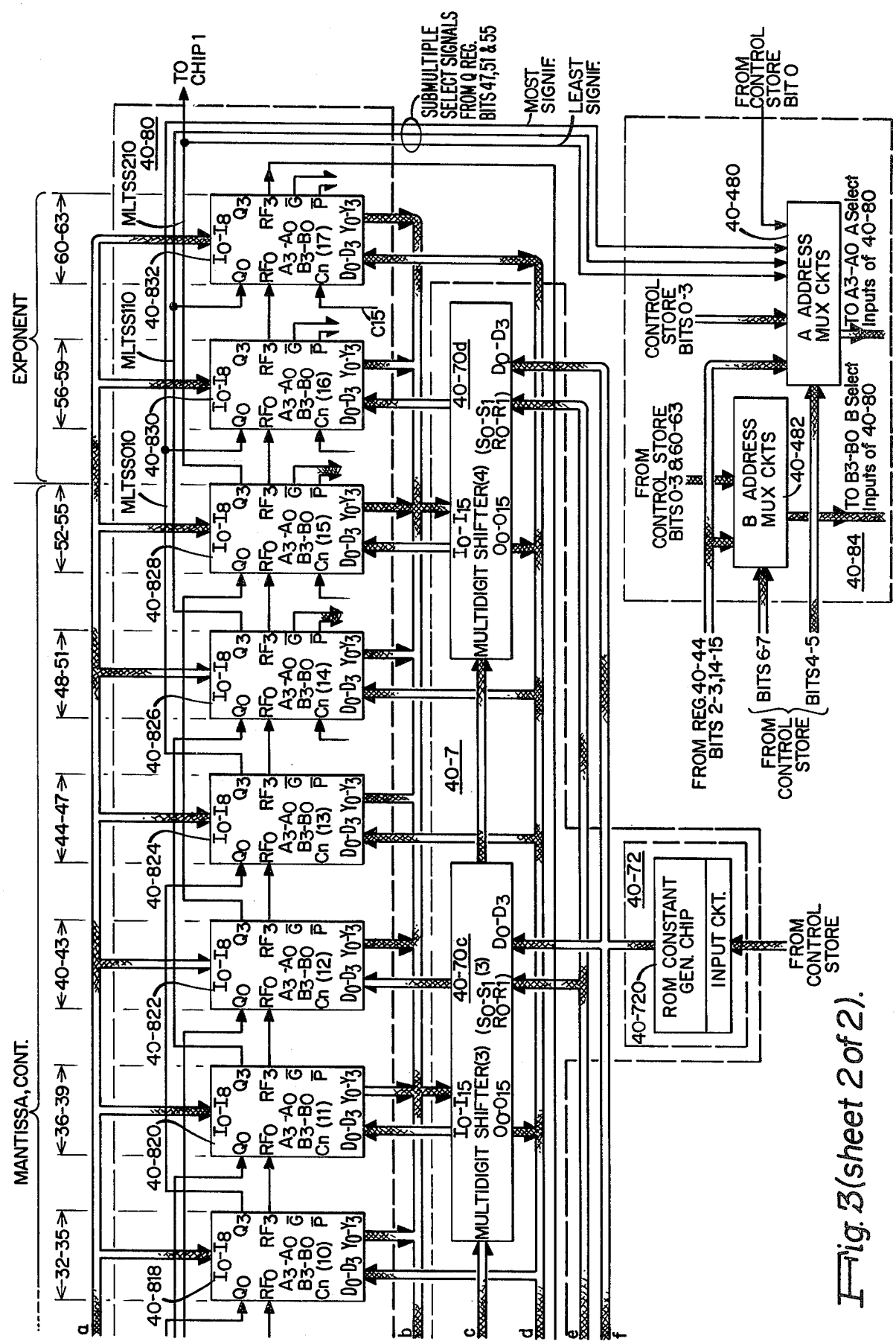
Fig. 3 (sheet 2 of 2).

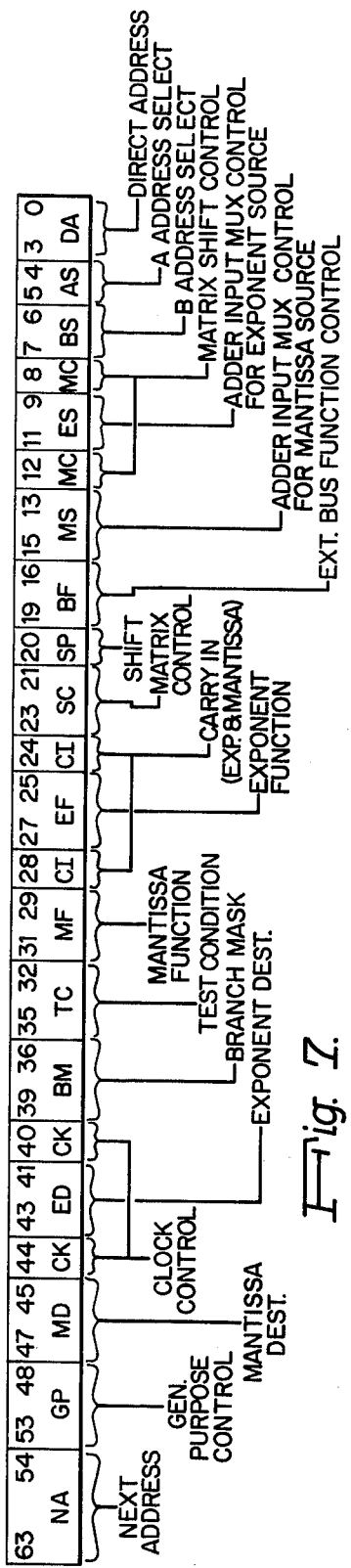

APPARATUS FOR PERFORMING FLOATING POINT ARITHMETIC OPERATIONS USING SUBMULTIPLE STORAGE

REFERENCED PATENTS

1. U.S. Pat. No. 3,818,203 titled "Matrix Shifter" invented by Andrew A. Perlowski, et al issued June 18, 1974 and assigned to Honeywell Inc.

2. U.S. Pat. No. 3,993,981 titled "Apparatus for Processing Data Transfer Requests in a Data Processing System" invented by Frank V. Cassarino, Jr., et al issued Nov. 23, 1976 and assigned to the same assignee as named herein.

BACKGROUND OF THE INVENTION

1. Field of Use

The present invention relates to apparatus for performing floating point operations on numbers represented in binary coded form and more particularly to apparatus for performing floating point operations using microprocessor chips including multiple storage.

2. Prior Art

The prior art discloses numerous ways for performing multiplication operations which involve initially generating a percentage of the total number of submultiples of an operand, storing these and then generating the remaining multiples from selected combinations of the prestored multiples. U.S. Pat. No. 3,293,419 is illustrative of this type of arrangement.

U.S. Pat. No. 3,641,331 provided apparatus which generated and stored a predetermined number of multiples and generated the remaining multiples by performing a single operation upon a selected prestored multiple. While the apparatus of the patent could be more easily constucted and reduced the time required for performing multiplication operations, it did not lend itself readily to construction in large scale integration (LSI) or medium scale integration (MSI) form.

However, certain semiconductor manufacturers have developed standard microprocessor chips which have reduced significantly the costs of constructing high speed arithmetic units.

For example, Advanced Micro Devices Inc. developed a 4 bit bipolar microprocessor slice on a chip designated as an AM2901. These chips when connected in parallel make it possible to carry out multiplication a bit at a time. Such an arrangement is described in a publication titled "4 Bit Expandable Bipolar Microcontroller 5701/6701" by Monolithic Memories Inc. dated May 1974. Such arrangements by being limited by the number of multiplier bits which can be processed in parallel are required to be operated at speeds slower than the previously described arrangements. In order to increase the number of multiplier bits which could be processed at a time, it would be necessary to modify such chips and increase the number of pins with attendant increases in chip costs.

Accordingly, it is a primary object of the present invention to provide an improved apparatus including means for generating and storing selective multiples of an operand and generate all required multiples of the operand as required by the operation within a minimum period of time.

It is a further object of the present invention to provide apparatus which can be constructed with standard microprocessor chips and which generates all multiples of a multiplicand during the performance of a multiplication operation.

It is a more specific object of the present invention to provide a low cost apparatus for performing floating point multiplication operations at high speed.

SUMMARY OF THE INVENTION

The above objects are achieved in a preferred embodiment of the present invention which includes a number of multibit LSI microprocessor chips connected in tandem as vertical slices. Each chip includes an arithmetic logic unit (ALU) and a random access memory (RAM). The ALUs are used to generate a predetermined number of submultiples of a mantissa portion of a floating point number which are stored in the chip's memory. The submultiples generated and stored correspond to all possible values of those multiplier digit positions used for selecting submultiples during the multiplication operation.

More specifically, in the preferred embodiment, selection circuits included in the chips select the least significant bit positions of the three successive multiplier digits for read out of a submultiple from the chips' memories. Based upon such digits, the chips' memories are arranged to store zero times, one times, ten times, eleven times, one hundred times, one hundred and one times, one hundred and ten times and one hundred and eleven times the multiplicand. The selected submultiple is summed with a partial product previously stored in the chips' memories by the ALUs to produce a final product. Thereafter, the bits of the multiplier and partial product are shifted by one bit position for selection of a next submultiple.

By the selecting of a predetermined bit of a number of successive multiplier digits, the bits representative of the partial product need only to be shifted by one bit position thereby increasing speed at which the multiplication is performed. Additionally, the arrangement of the preferred embodiment reduces cost in that such shifting takes advantage of a one bit shifting facility incorporated into each such microprocessor chip. Similarly, advantages result in the case of the multiplier in that the multiplier bits need only be shifted by one bit position for selection of a next submultiple.

Since multiplication of the least significant bits of the multiplier digits takes place first, both the partial product and multiplier bits can be shifted in the same direction. This also simplifies and increases the speed of the multiplication operation.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIG. 3 shows in block diagram form the apparatus of the present invention.

FIG. 6 shows the allocation of register storage for the microprocessor chips of FIG. 3.

FIG. 7 shows the format of the microinstruction words included within the control store section of FIG. 2.

FIGS. 8 through 10 illustrate the values generated and stored by the apparatus of FIG. 2 during the performance of an exemplary multiplication operation.

DESCRIPTION OF THE PREFERRED EMBODIMENT

Figure 1:
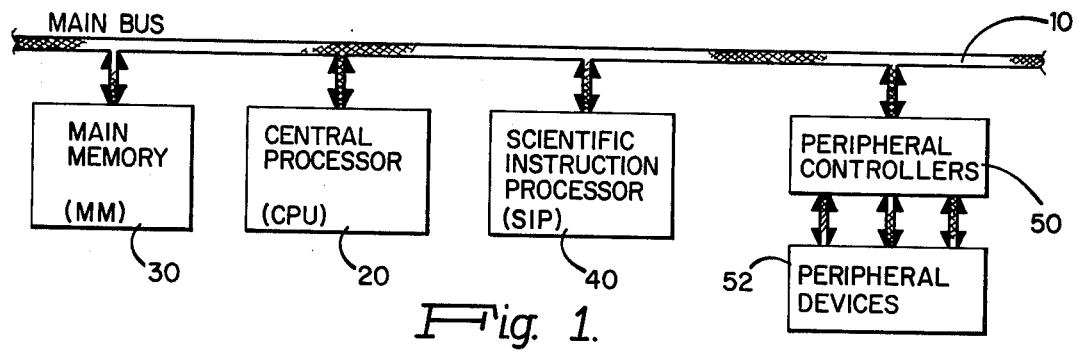
FIG. 1 is a block diagram of a system which utilizes the apparatus of the present invention.

FIG. 1 illustrates a system which utilizes the apparatus of the present invention. Referring to the Figure, it is seen that it includes a main bus 10 which couples to a main memory 30, a central processor 20, a scientific instruction processor 40 (SIP) and various peripheral controllers, such as controller 50 which controls the operation of a number of peripheral devices 52. Any one of the devices coupled to the bus 10 may address main memory 30 or any other unit connected to the bus. As shown herein, the bus 10 includes a number of control lines, address lines and data lines for transmission of instructions and data. For further information regarding the operation of the system of FIG. 1, reference may be made to U.S. Pat. No. 3,993,981.

Figure 2:
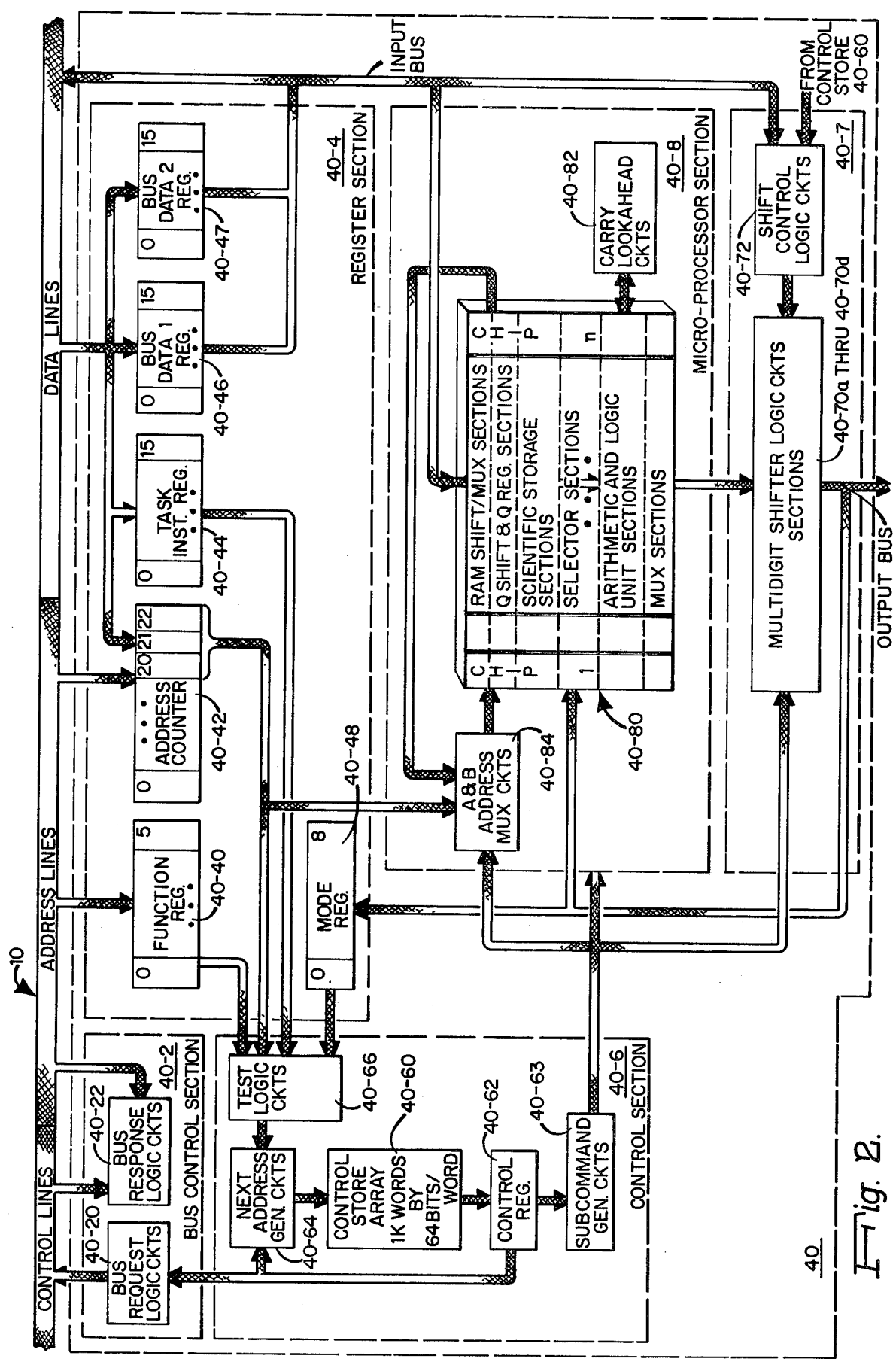
FIG. 2 is a block diagram of a scientific processor of FIG. 1 which includes the apparatus of the present invention.

FIG. 2 illustrates in block diagram form the main sections of scientific instruction processor (SIP) 40 which relate to the apparatus of the present invention.

SIP Sections and Bus Control Section 40-2

Referring to FIG. 2, it is seen that the SIP 40 includes a number of sections. The sections are a bus control section 40-2, a register section 40-4, a control store section 40-6, a shift logic circuit section 40-7, and a microprocessor section 40-8. The section 40-2 includes bus request logic circuits and bus response logic circuits of blocks 40-20 and 40-22 respectively. These circuits enable the SIP 40 to communicate over bus 10 under the control of section 40-6.

Register Section 40-4

The section 40-4 includes a plurality of registers 40-40 through 40-48 connected as shown. Four of these registers 40-40, 40-42, 40-44 and 40-48 provide input signals to test logic circuits of a block 40-66 of section 40-6. The function register 40-4 is a 6 bit register that stores a function code applied to the address lines of bus 10 during an input or output bus cycle of operation. Thereafter, SIP 40, under microprogram control, examines the contents of the register 40-40 by the test logic circuits 40-66 and executes the command specified. The microprogram routines selected define which information and control the transfer of that information between bus 10 and the various registers, buses and sections of SIP 40. The address register 40-42 is a 22 bit register which normally is used for storing a main memory operand address received via the address lines of bus 10 when SIP 40 accepts an output command from CPU 20. As explained herein, address register 40-42 is used as a counter during a multiplication operation.

That is, certain bit positions are incremented and tested for specific counts under microprogram control.

The next register 40-44 (task register) is a 12 bit register that is used to store a first word of a scientific instruction received from the data lines of bus 10 when SIP 40 accepts an output command from CPU 20. The SIP 40 under microprogram control decodes the first instruction word via the circuits included in the next address generation circuits block 40-64, producing the starting address of the microprogram routine required for processing that instruction. Also, certain bits of this register are used to specify which scientific accumulator register is to be used. For example, bit positions 2 and 3 specify the scientific accumulator register used as an A operand source/result destination for the current instruction. Task register bit positions 14 and 15 specify the scientific accumulator register that is used as a B operand (effective address) for the current instruction.

The mode register 40-48 is an 8 bit register which stores information received from CPU 20. The information is initially received from the data lines of bus 10 and loaded into the bus data register 1 40-46. Thereafter, the contents of register 40-46 are transferred through sections 40-8 and 40-7 and loaded into register 40-48. The information is used to control the execution of those microinstruction sequences sensitive to operand lengths or to round/truncate modes of operation. Since this is not pertinent to an understanding of the present invention, this register will not be discussed further.

The bus data registers 40-46 and 40-47 designated as BD1 and BD2, are 16 bit registers that are used to store information received from the data lines of bus 10. Register 40-46 normally receives data resulting from a single word operations (e.g. instruction word from CPU 20) while register 40-47 normally receives data resulting from double word operations (second word of a double integer from CPU 20).

Control Section 40-6 and Microinstruction Format

The control section 40-6 includes a control store 40-60 constructed from 1024 read only storage (ROS) locations, each including 64 bits, a ROS local register 40-62 for storing a microinstruction word read out of control store 40-60 during a cycle of operation, subcommand generator circuits 40-63 for decoding and distributing control signals to the various portions of SIP 40, ROS next address generation circuits 40-64 and the test logic circuits of block 40-66. As explained herein, the circuits 40-64 normally generate the address of the next location as a function of a next address field of the microinstruction word and output signals from the test logic circuits 40-66. That is, the test logic circuits 40-66 select one of 64 possible test conditions based upon the coding of another field of the microinstruction word. The output signals generated in conjunction with the next address field are used to form the next address.

Additionally, as mentioned, the circuits 40-64 also generate the next address to the starting location of the microprogram for processing the instruction by decoding the instruction word stored in task register 40-44. For the purpose of the present invention, the test logic circuits 40-66 and address generation circuits 40-64 can be considered conventional in design. For example, they may take the form of circuits described in U.S. Pat. No. 3,909,800 which is assigned to the same assignee as named herein.

The various fields mentioned are illustrated in the format of the microinstruction word of FIG. 7. Referring to the Figure briefly, it is seen that each microinstruction word includes 19 distinct fields designated DA through CK. These fields are used as follows:

1. The Direct Address (DA) field includes bits 0 through 3 of the microinstruction word. This field supplies a direct address that is used to select one of the 16 accumulators contained within the scientific storage.

2. The A-Select (AS) field includes bits 4 and 5 of the microinstruction word, and is used to select which one of the four inputs to the A address multiplexer circuits 40-840.

3. The B-Select (BS) field includes bits 6 and 7 of the microinstruction word, and is ued to select which one of the four inputs to the B address multiplexer circuits 40-842.

4. The Exponent Source (ES) field includes bits 9 through 11 of the microinstruction word, and controls the adder input multiplexers for bits 56 through 63 of the floating point word (i.e., the exponent portion of the word). Therefore, the ES field determines the operand source for the A and B inputs of the adder unit associated with each exponent digit.

5. The Mantissa Source (MS) field includes bits 13 through 15 of the microinstruction word, and controls the adder input multiplexers for bits 0 through 55 of the floating point word (i.e., the mantissa portion of the word). Therefore, the MS field determines the operand source for the A and B inputs of the adder unit associated with each mantissa digit.

6. The External Bus Function (BF) field includes bits 16 through 19 of the microinstruction word, and is used to control various processor operations associated with the external bus (interface).

7. The Shift Control (SC) field includes bits 21 through 23 of the microinstruction word, and is used to control the type of operations performed by the multi-digit shifter circuits.

8. The Exponent Function (EF) field includes bits 25 through 27 of the microinstruction word. These three bits provide controls for all operations within the arithmetic logic unit associated with each exponent digit (i.e., bits 56 through 63 of the floating point word).

9. The Mantissa Function (MF) field includes bits 29 through 31 of the microinstruction word. These three bits provide control for all operations within the arithmetic logic unit associated with each mantissa digit (i.e., bits 0 through 55 of the floating point word).

10. The Test Condition (TC) field includes bits 32 through 35 of the microinstruction word. This field is used in conjunction with a Branch Mask (BM) field to select the specific test function that will be used in generating the next control store address.

11. The Branch Mask (BM) field includes bits 36 through 39 of the microinstruction word. As mentioned, this field is used in conjunction with the TC field to select the specific test function that will be used in generating the next address.

12. The Exponent Destination (ED) field includes bits 41 through 43 of the microinstruction word. This field controls the three sets of multiplexers associated with the exponent portion of the floating point word (i.e., bits 56 through 63), thereby controlling all data movement and shift operations within the microporcessor ALU (exponent digits).

13. The Mantissa Destination (MD) field includes bits 45 through 47 of the microinstruction word. This field controls the three sets of multiplexers associated with the mantissa portion of the floating point word (i.e., bits 0 through 55); thereby, controlling all data movement and shift operations within the microprocessor ALU (mantissa digits).

14. The General Purpose (GP) field includes bits 48 through 53 of the microinstruction word. The GP field is used to generate either constants or SIP subcommands, depending on the state of bit 48 (i.e., bit 48 true - generate subcommands, bit 48 false - generate constants).

15. The Next Address (NA) field includes bits 54 through 63 of the microinstruction word and defines the next sequential address.

16. The Matrix Control (MC) field includes bits 8 and 12 of the microinstruction word. These bits determine the displacement (shift count) source for the matrix shifter circuit.

17. The Split (SP) field includes bit 20 of the microinstruction word and its use is not pertinent to the present invention.

18. The Carry-In (CI) field includes bits 24 and 28 of the microinstruction word. These bits supply the carry inputs for the exponent and mantissa portions of the floating point word, respectively.

19. The Clock Control (CK) field includes bits 40 and 44 of the microinstruction word and establishes the control store cycle time.

Microprocessor Section 40-8

This section includes a microprocessing unit 40-80 and A and B address multiplexer circuits of block 40-84 and a number of carry generation circuits of block 40-82. The section 40-80 is constructed from 16 large scale integrated (LSI) microprocessor chips designated 40-800 through 40-832 in FIG. 3. In a preferred embodiment, the chips correspond to type 2901 chips manufactured by Advanced Micro Devices Inc. Each such chip shown in block form in FIG. 4 processes 4 bits. Sixteen such chips are interconnected as illustrated in FIG. 3 to make up a 64 bit microprocessing unit. As explained herein, the first 14 chips, corresponding to bits 0-55, store and process mantissa values of a floating point number while the next 2 chips store and process the exponent values of the floating point number. A last chip stores decimal point and sign values as explained herein. The entire 16 chips are used to generate and store submultiples as explained herein.

Figure 5:
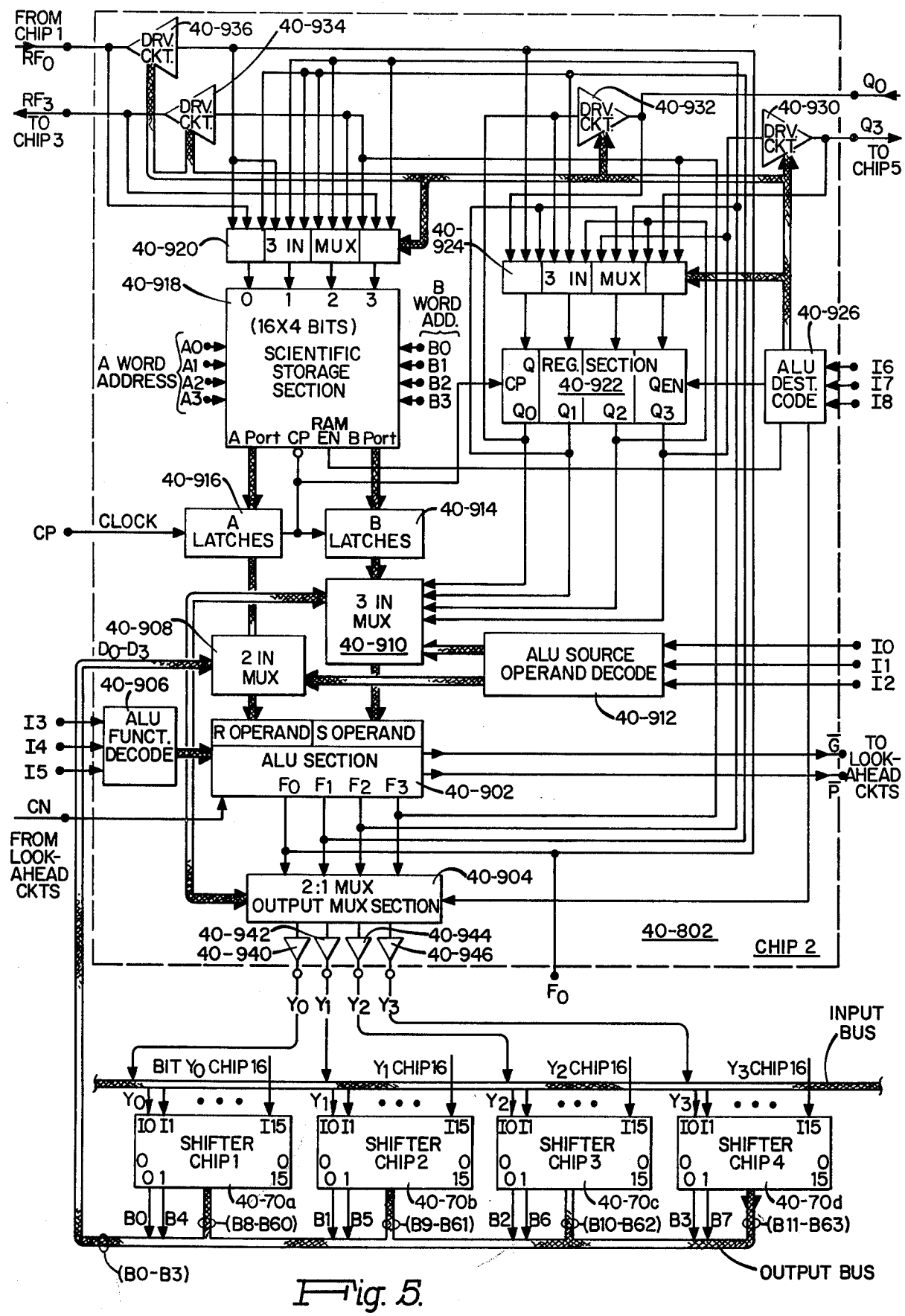
FIG. 5 shows in greater detail the microprocessor chip of FIG. 4 and the apparatus of FIG. 3.

As seen from FIG. 2, microprocessor section 40-80 is divided horizontally into a number of RAM shift and multiplexer sections, Q shift and Q register sections, scientific storage sections, selector sections, arithmetic and logic (ALU) sections and output multiplexer sections. FIG. 5 shows in greater detail the sections of each chip. Additionally, the RAM shift and multiplexer sections include two 64 bit multiplexer circuits that are used for both shift operations and normal data transfers. That is, these circuits provide a direct transfer or a shift to the left or to the right of data before being loaded into the storage sections.

As illustrated in FIG. 3, shift connections between the chips storing the mantissa values are arranged in a predetermined manner in accordance with the present invention. That is, the Q3 shift output of each chip connects to the input Q0 of every third chip (e.g. the Q3 output of chip 1 connects to the Q0 input of chip 4). This allows the right shifting of 8 bit positions (2 hexadecimal digits) within a single shift cycle of operation. The Q shift connections between the chips storing the exponent values are arranged in a similar manner.

The Q shift and Q register sections include one 64 bit multiplexer circuit and a 64 bit Q register for storing the bits of the multiplier. The 64 bit multiplexer enables a direct transfer or a shift to the left or to the righ of the multiplier bits before being loaded into the Q register.

The scientific storage sections contain 16 64 bit storage locations wherein two separate locations of the 16 locations can be accessed simultaneously to provide both an A and B operand. As explained herein, the locations are addressed by the A and B address multiplexer circuits of block 40-84. The locations 1, 2 and 3 serve as scientific accumulators SA1, SA2 and SA3 while the remaining locations are used for temporary storage. The allocation of each storage location is as shown in FIG. 6. As explained herein, accumulator SA1 is loaded with the multiplicand while accumulator SA2 is loaded with the multiplier by instructions in a conventional manner. Briefly, data bits of the first two words (32 bits) of a 4 word operand applied to the data lines of bus 10 by CPU 10 are loaded into bus data registers 40-46 and 40-47. The first two words data contents of these registers applied to an input bus are transferred through the shifter logic circuits 40-70 of section 40-7 without shifting and applied to an output bus. From there, the first two words are passed through the arithmetic and logic unit sections and stored in one of the accumulator locations of the scientific storage sections.

The next two words of the 4 word operand received from CPU 10 are transferred to the shifter logic circuits 40-70 and shifted by 32 bit positions through shifter section 4-7. The second two words are thereafter passed through the arithmetic and logic sections and stored in the same accumulator location. Mode register 40-48 has certain bit positions set to predetermined states for indicating to the SIP 40 the length of the stored operand (i.e., that the particular accumulator location is storing a 4 word operand).

Referring to FIG. 6, the location assigned address $0_{16}$ initially serves as a temporary accumulator and as such stores the 56 bits mantissa value and the 8 bit exponent value of the multiplier during submultiple generation. The exponent value is normally expressed in "excess 64" form and has a range from $+63_{10}$ through $-64_{10}$. While the SIP 40 performs binary arithmetic operations on operands, such operations are viewed as hexadecimal arithmetic.

The correspondence between exponent values expressed in "excess 64" form and in binary form are illustrated by the following table:

| IN BINARY FORM | IN EXCESS 64 FORM |
|---|---|
| $0111\ 1111_2 = 127$ | $(0)011\ 1111 = 63$ |
| . | . |
| . | . |
| . | . |
| $0100\ 0000 = 64$ | $(0)000\ 0000 = 0$ |
| $0011\ 1111 = 63$ | $(1)111\ 1111 = -1$ |
| . | |
| . | |
| . | |
| $0000\ 0000 = 0$ | $(1)011\ 1111 = -64$ wherein |
| 0 designated sign bit wherein 1 = minus and 0 = plus. | |

It will be appreciated that using "excess 64" form eliminates the need for an exponent sign. However, since the multiplier and multiplicand exponents may be added together giving a resulting product exponent of excess 128, it becomes necessary to subtract the value $64_{10}$ from the multiplier exponent value.

Referring again to FIG. 6, it is seen that the locations assigned addresses $1_{16}$ and $3_{16}$ serve as scientific accumulators SA1, SA2 and SA3 as mentioned above. The locations assigned addresses $0_{16}$, $4_{16}$, $5_{16}$, $6_{16}$ and $7_{16}$ serve as working accumulators and are not pertinent to the present invention. However, the locations assigned addresses $8_{16}$ through $F_{16}$ store the submultiples of the multiplicand mantissa designed in FIG. 6. More specifically, the location assigned addresses $8_{16}$ stores the times ZERO (XO) submultiple of the mantissa or 56 binary ZEROS.

The locations designated by address $9_{16}$ stores a submultiple having a value which equals 1 times the multiplicand (mantissa). However, as explained herein, the submultiples are generated from the 56 bit multiplicand values, they are stored within 64 bit registers (exponent 8 bit positions are not used). This provides increased accuracy and eliminates additional shifting operations. That is, when the 56 bit multiplicand is stored in the 64 bit register location, the two additional digit positions in effect decrease the value of such multiplicand by 100. Hence, the 1 times submultiple corresponds to a value of 0.01 times the multiplicand as indicated in FIG. 6. Thus, location designated by address $9_{16}$ stores the multiplicand mantissa value shifted by two hexidecimal digits (8 bits) to the right.

The location designated by address $A_{16}$ stores a submultiple having a value which equals 10 times the multiplicand mantissa. However, when stored in the designated 64 bit location, this submultiple has a value of 0.10 times the multiplicand as indicated in FIG. 6. Stated differently, the location designated by address $A_{16}$ stores the multiplicand mantissa value shifted by one hexidecimal (4 bits) to the right. The location designated by address $B_{16}$ stores a submultiple having a value which equals 11 times the multiplicand mantissa. When stored in the designated 64 bit location, this submultiple has a value of 0.11 times the multiplicand as indicated in FIG. 6. Thus, this location stores a submultiple having a value corresponding to the sum of the submultiple contents of the locations designated by addresses $9_{16}$ and $A_{16}$.

The location designated by address $C_{16}$ stores a submultiple having a value which equals 100 times the multiplicand mantissa. When stored in the designated 64 bit location, this submultiple has a value of 1.00 times the multiplicand as indicated in FIG. 6. Thus, this location stores a submultiple corresponding to the multiplicand mantissa. The next location designated by address $D_{16}$ stores a submultiple having a value which equals 101 times the multiplicand. When stored in the designated 64 bit location, this submultiple has a value of 1.01 times the multiplicand as indicated in FIG. 6. Thus, this location stores a submultiple having a value corresponding to the sum of the submultiple contents of the locations designated by addresses $9_{16}$ and $C_{16}$.

As seen from FIG. 6, the next location designated by address $E_{16}$ stores a submultiple having a value which equals 110 times the multiplicand mantissa. When stored in the designated 64 bit location, this submultiple has a value of 1.10 times the multiplicand as indicated in FIG. 6. Thus, this location stores a submultiple having a value corresponding to the sum of the submultiple contents of the locations designated by addresses $C_{16}$ and $A_{16}$. The last location designated by address $F_{16}$ stores a submultiple having a value which equals 111 times the multiplicand mantissa. When stored in the designated 64 bit location, this submultiple has a value of 1.11 times the multiplicand as indicated by FIG. 6. Thus, this location stores a submultiple having a value corresponding to the sum of the submultiple contents of the locations designated by addresses $9_{16}$ and $E_{16}$.

The most significant bit position of the addresses $8_{16}$ through $F_{16}$ is forced to a binary ONE to enable the addressing of the upper 8 locations and is set in a conventional manner not pertinent to the present invention. However, the three low order address bits are taken from the multiplier and are applied to A and B address multiplier circuits of the address section 40-9 of FIG. 2 as explained herein.

The selector sections include two 64 bit latches, 16 pair of 2 to 1 data input multiplexers and 16 3 to 1 data input multiplexers. As explained herein, the data input multiplexers allow data signals to be applied to the ALU sections from the output bus via input terminals D0 through D3, the two latches or the Q register. The two latches hold the data signals being read out of the scientific storage sections to ensure that sufficient time is available for performing parallel operations during read and outdate operations.

The ALU sections perform all normal arithmetic and logic operations including carry generation, overflow, result sign and all ZEROS detection, ones complement and two's complement arithmetic. As explained herein, input bit signals I3 through I5 from the control store 40-60 are coded to define which one of the possible three binary arithmetic and five logic operations are to be performed. As seen from FIG. 3, signals from the carry generate ($\overline{G}$) and carry propagate ($\overline{P}$) terminals of each of the chip sections in conjunction with the carry generation chip circuits 40-82a through 40-82f of block 40-82 form look ahead circuits which determine when the signals applied to the carry input (CN) terminals are to be propagated through the different chip sections. For the purpose of the present invention, the carry look ahead chip circuits of block 40-82 may be considered conventional in design and for example are constructed from standard integrated circuits such as type SN74S182 manufactured by Texas Instruments Inc.

The output multiplexer sections include a 64 bit multiplexer. This multiplexer receives data either directly from the scientific storage sections via one of the latches or from the ALU. The multiplexer applies output signals to the input bus for distribution to the various sections of SIP 40. The last section 40-84, as seen from FIG. 3, includes an A address multiplexer circuit 40-480 and a B address multiplexer circuit 40-482. These circuits provide 4 bit A select addresses and 4 bit B select addressed which applied to the input terminals A0-A4 and B0-B4 of each of the chip sections as indicated in FIG. 3. The A select address causes the 64 bit contents of a selected location to the read out and applied as an A opened input for use by the ALU or for distribution as an output.

Four sets of input signals applied to the A address multiplexer circuit 40-480 include bits 0-3 of control store 40-60, mutiplier signals MLTSS010 through MLTSS210, bit signals 2 and 3 from task register 40-44 and bit signals 14 and 15 from task register 40-44. The control bits 4 and 5 are coded to designate which one of the four sets of inputs are to be used in generating the A select address signals applied to inputs A0-A3. Control store bits 0-3 are coded to address directly any one of the 16 scientific storage locations.

The signals MLTSS010 through MTSS210 correspond to the signals applied from the Q register bit positions 47, 51 and 55 to the Q shift out terminals of chip sections 12, 13 and 14 of FIG. 3. These bit positions store the three most significant bits of three successive multiplier digits used to select the appropriate submultiple from scientific storage locations with addresses 8 through F in accordance with the teachings of the present invention. Signal MLTSS010 corresponds to the most significant bit of the three submultiple select bits (100's position). Signal MLTSS110 corresponds to the next most significant bit of the three submultiple select bits (10's position) and signal MLTSS210 corresponds to the least significant bit of the three submultiple select bits (1's position).

Task register bits 2 and 3 are used address one of the three scientific accumulator locations having addresses 1 through 3 that is used to store A operand or result data. The task register bits 14 and 15 are used to address another one of the three scientific accumulator locations used to store B operand source data.

The B select address causes the 64 bit contents of the location selected to be read out and applied as a B operand for use by the ALU or for distribution as an output. The four sets of input signals applied to the B address multiplexer circuit 40-482 include control store bits 6 and 7, control store bits 60 through 63, task register bit signals 2 and 3 and task register bit signals 14 and 15. The last two sets of inputs perform the same operations as indicated above with respect to A address multiplexer circuit 40-480. Control store bits 6 and 7 are coded to designate which set of inputs are to be used in generating the B select address signals applied to inputs B0-B3. Control store bits 60-63 are coded to address any one of the 16 scientific storage locations.

Shift Logic Circuit Section 40-7

This section is used for shifting either the exponent or mantissa portion of a floating point number prior (e.g. normalization) or during the execution of a scientific instruction. As seen from FIG. 3, this section includes four 16 by 16 multidigit shifter matrix chips 40-70a through 40-70d and logic circuits of block 40-72. The shifter networks for the purpose of the invention may be considered conventional in design. For example, they may take the form of the matrix shifter disclosed in U.S. Pat. No. 3,818,203.

The data input lines I0 through I15 of the shifter matrix chips 40-70a through 40-70d connect to the input bus for receiving the data bits (exponent or mantissa portion) of the number to be shifted. The particular type of operation (e.g. shift, right rotate arithmetic) to be performed is defined by the coding of control store bits 21 through 23 which are applied to the function input terminals S0-S1 and R0-R1 of the matrix shifter chip 40-70a through 40-70d.

As seen from FIG. 3, each matrix shifter chip includes a set of displacement input terminals D0-D3 which control the displacement of bits from the data input lines I0 through I15 to a set of data output lines O0 through O15 (i.e., from the input bus to the output bus). For example, it is assumed that the control store bits 21 through 23 are coded to have a value of 110 (specifying a right shift operation) and the displacement value is coded to have a value 0001 (single digit shift). Under these conditions, the bit applied to the I0 input terminal (i.e., bit 0) is displaced one bit position and applied to output terminal 01. However, since output terminal 01 corresponds to output bus bit 4, bit 0 is displaced by four bits or one hexidecimal digit as required by the displacement code value of 0001 (see FIG. 5).

The circuits of block 40-72 generate the coded displacement values. While such circuits include multiplexer chips, conventional in design, for selecting signals from other sources (e.g. leading zeros detector circuits for normalizing operations, exponent diference detector circuits for equalization operations which specify how many digit shifts are to be performed), only the constant generator circuits 40-720 are shown for purposes of simplicity. The circuits 40-72 include a read only memory (ROM) 40-720 function/constant generator circuit which is shown as being directly connected to the shifter circuits for ease of explanation.

Signals from control store 40-60 are applied to the input circuits of the ROM circuit 40-720. The circuit 40-720, conventional in design, generates a constant representative of a shift count specifying how many digit shifts (mantissa digits) must be performed by the shifter 40-70. Thus, the ROM circuit 40-720 can be viewed as converting the signals applied to its input circuits to shift counts. The shift count read out from the circuit 40-720 is applied to the D0-D3 terminals of the shift matrices 40-70a through 40-70d.

Figure 4:
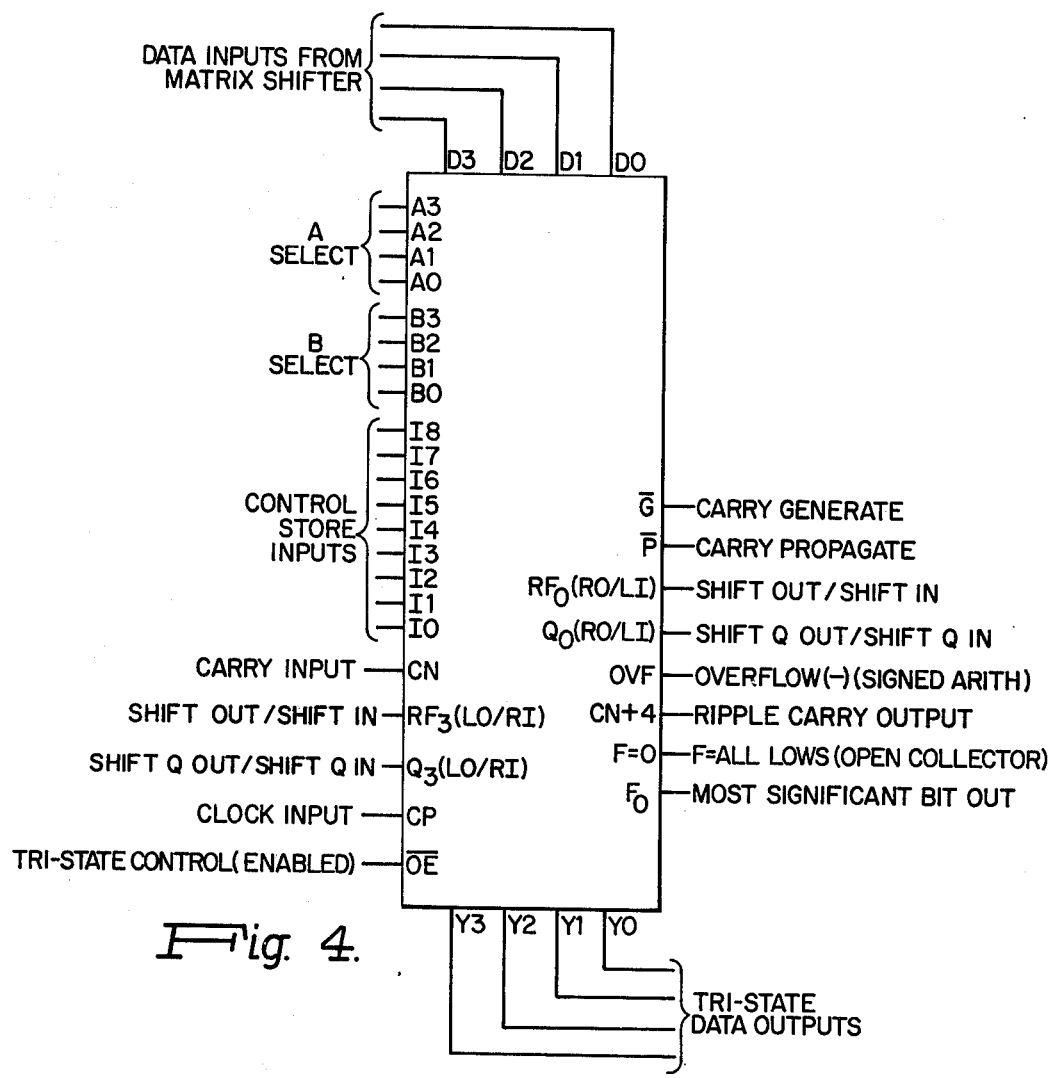
FIG. 4 shows in block form the microprocessor chip used in constructing the preferred embodiment of the present invention.

Microprocessor Chip FIGS. 4 and 5

The chip which is used in constructing the microprocessor sections of FIGS. 2 and 3 will now be discussed in greater detail with reference to FIGS. 4 and 5. Referring first to FIG. 4, it is seen that each chip has 38 pin connections which include connections of receiving an enabling voltage (connection $\overline{OE}$) and a clock input (connection CP). The pin connections designated D0-D3 are connected to receive data signals from the output bus. The pin connections $\overline{P}$ and $\overline{G}$ apply output signals to one of the stages of the carry lookahead circuits. The carry in (CN) pin connection receives an input signal from such lookahead circuits as mentioned herein. A further carry out pin connection (Cn + 4) is not used.

The shift out/shift in (RFO) pin connection receives an input signal from the shift out/shift in (RF$_3$) pin connection of a preceding chip. The shift Q out/shift Q in (Q0) pin connections receives an input signal from the shift out/shift in (Q3) pin connection of a preceding chip. The overflow (OVF) pin connection, function signal zero (F = 0) connection and most significant bit out (F0) pin connection provide additional indications which are not pertinent to the present invention.

The pin connections Y0-Y3 are connected to provide output signals to the shifter matrix chips while the pin connections I0-I8 are connected to receive control signals generated from control store microinstruction fields MS, MF and MD or ES, EF and ED of FIG. 7 for mantissa digit or exponent digits respectively. The pin connections A0-A3 and B0-B3 as mentioned previously are connected to receive the A select and B select address signals from the circuits of block 40-84.

Now referring to FIG. 5, it is seen that each chip represented by chip 2 includes a 16 word by 4 bit RAM 40-918 and a high speed ALU 40-902. Under the control of the 4 bit address applied to the pin connections A0-A3, the contents of any one of the 16 word locations are read out to a set of A port terminals. Similarly, under the control of the 4 bit address applied to pin connections B0-B3, the contents of any one of the same 16 word locations are read out to a set of B port terminals.

When enabled by a signal applied to a RAMEN input by the ALU destination decode circuits of block 40-926, new data signals applied via a three input multiplexer circuit 40-920 are written into the word location defined by the B select address signals. As seen from FIG. 5, the three input multiplexer circuit 40-920 inputs are connected so as to allow the input signals from the ALU 40-902 output terminals F0-F4 to be shifted right one bit position, shifted left one bit position or not shifted in either direction under control of the circuits of block 40-926 before being written into the designated storage location.

The A port output terminals and B port output terminals, connect to the set of A latches and set of B latches respectively. These latches store the signals transferred thereto during the interval when the signal applied to the clock input CP is a binary ZERO (i.e., low). This eliminates the possibility of any race conditions occurring during the interval when new data is being written into RAM 40-918. As mentioned, the ALU conditioned by the signals applied to pin connections I3-I5 decoded by the circuits of block 40-906, is able to perform any one of three binary arithmetic or five logic operations upon the two 4 bit input signals applied to R operand and S operand output terminals.

The R operand input terminals receive signals directly from pin connections D0-D3 or from the A latches 40-916 via a 2 input multiplexer circuit 40-908 as shown in FIG. 5.

The S operand input terminals receive signals from the A latches 40-916, the B latches 40-914 or from the Q register 40-922 via a 3 input multiplexer circuit 40-910. The multiplexers 40-908 and 40-910 is under the control of the signals applied to pin connections I0-I2 which are decoded by the operand decode circuits of block 40-912. The pin connections D0-D3 are used to load data signals into the working registers of the chip and to modify the contents of RAM locations. The Q register 40-922 is a 4 bit register which as previously mentioned is used to store the multiplier during multiplication operations.

The ALU output signals present at terminals F0-F3 are applied to one input of a 2 input output multiplexer circuit to one input of the 3 input multiplexer circuit 40-920 and to one input of a 3 input multiplexer circuit 40-924 associated with the Q register 40-922. The actual destination (i.e., data output at pin connections Y0-Y3, input to RAM 40-918 or Q register 40-922) is selected by the signals applied to pin connections I6-I8 which are decoded by the circuits of block 40-926.

As seen from FIG. 5, the multiplexer circuit 40-904 is used to select signals read out from the A port of RAM 40-918 or signals from the output terminals F0-F4 of ALU 40-902. The selection proceeds under the control of the signals applied to the pin connections I6-I8 as mentioned previously. As previously mentioned, the multiplexer circuit 40-920 provides inputs from three sources, including the ALU 40-902.

The above allows the ALU outputs to be stored nonshifted, shifted right one position (i.e., X2) or shifted left one position (i.e., ÷ 2). It will be noted that the shifting circuits include the pin connections RF0 and RF3 which connect to the buffer driver circuits 40-934 and 40-936 respectively. In the shift left mode, the driver circuit 40-934 is enabled and the RF0 multiplexer input is enabled. In a shift right mode, the driver circuit 40-936 is enabled and the RF3 multiplexer input is enabled. In the no shift mode both driver circuits 40-934 and 40-936 are not enabled and the multiplexer inputs mentioned are not selected. The selection of operations proceeds under the control of the signals applied to the pin connections I6-I8.

Similarly, the Q register 40-922 is also connected to the 3 input multiplier circuit 40-924 which also includes shifting circuits. This allows the ALU output signals to be stored non-shifted, shifted right one position (i.e., X2) or shifted left one position (i.e., ÷ 2). The shifting circuits include pin connections Q0 and Q3 which connect to the buffer driver circuits 40-932 and 40-930 respectively. In the shift left mode, the buffer circuit 40-932 is enabled and the Q0 multiplexer input is enabled. In the shift right mode, the buffer circuit 40-930 is enabled and the Q3 multiplexer input is enabled. In the no shift mode, both the buffer circuits 40-932 and 40-930 are not enabled and the multiplexer inputs mentioned are not selected. Again, the shifting operations are selected under the control of the signals applied to the pin connections I6-I8. Data signals are clocked into the Q register 40-922 under the control of the signals applied to the clock input pin connection CP.

FIG. 5 also illustrates the manner in which the output pin connections Y0 - Y3 of chip 2 connect to a different one of the input terminals of each of the multiposition shifter circuit chips 40-70a through 40-70d via the input bus. Additionally, FIG. 5 shows the shifter circuit pin connections from the output bus to the data input pin connections D0-D3 of chip 2.

DESCRIPTION OF OPERATION

With reference to FIGS. 1–7, the example values of FIGS. 8–10 and the flow chart of FIG. 11, the operation of the present invention will now be described. Before the example, it is desirable to discuss briefly the manner of performing floating point multiplication. As mentioned previously, all numbers in binary floating point notation have a mantissa which is less than one and an exponent, the portion of the number which indicates its size. As previously mentioned, the range of exponents is from $+63_{10}$ through $-64_{10}$ in the present system.

For numbers greater than one, the binary point is moved to the left (i.e., divide by 2) until the left most 1 is to the right of the binary point. For numbers which are already fractions, the binary point is moved to the right (i.e., multiply by 2) until the first 1 is encountered. In such cases, all numbers are fractions greater than or equal to one-half but less than 1 and are termed to be "normalized".

In the present system, the numbers to be multiplied are assumed to be in normalized form. The manner of normalizing (e.g. prenormalization and postnormalization) can be considered to be conventional and is not pertinent to an understanding of the present invention. For a further discussion of normalization, reference may be made to Chapter 15 of the text "The Logic of Computer Arithmetic" by Ivan Flores published by Prentice-Hall Inc. Copyright 1963.

It will be assumed that the CPU 20 transfers a scientific instruction to SIP 40 which is coded to specify a multiplication operation. In response to the instruction which is loaded into task register 40-44, the SIP 40 performs those operations for fetching and storing normalized multiplicand and multiplier values as required.

Figures 8, 9:
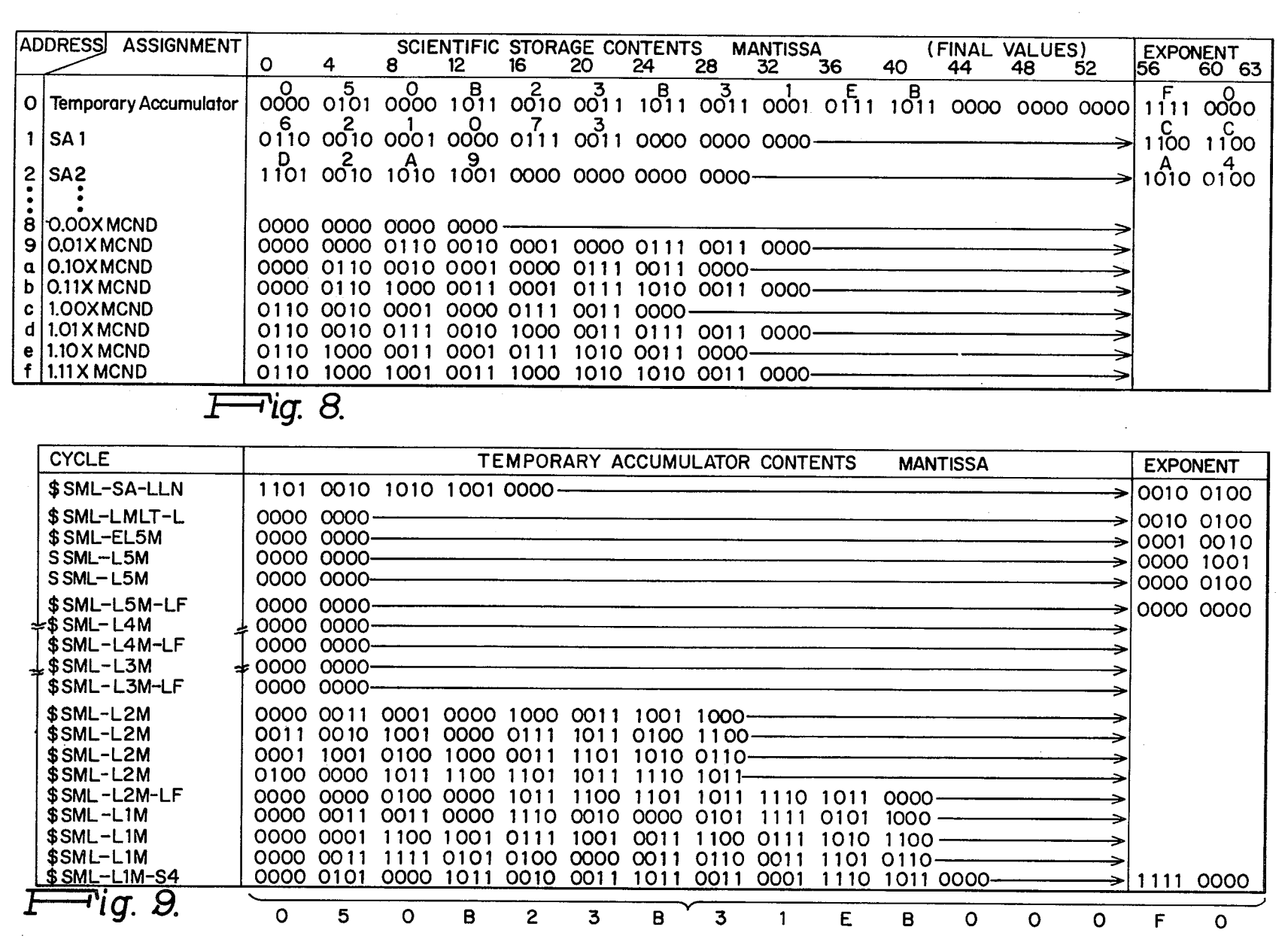

It is assumed in the example that the multiplicand value in hexadecimal form shown in FIG. 8 is initially stored in 64 bit accumulator location SA1 of the scientific storage while the multiplier value in hexadecimal form shown in FIG. 8 is initially stored in accumulator location SA2. The loading of scientific accumulators SA1 and SA2 proceeds in a conventional manner as outlined above.

For the example given herein, the values for the multiplicand and multiplier shown in FIG. 8 are as follows:

|  |  | Mantissa | Exponent |
|---|---|---|---|
| Multiplicand | = | .621073 | CC |
| Multiplier | = | D2A9 | A4. |

Other locations corresponding to addresses 8-F store the values in hexadecimal form of submultiples which are generated from the multiplicand as explained herein and are used during the execution phase of the multiplication operation. All values are in normalized form.

FIG. 9 illustrates the values of partial products and final products stored in the temporary accumulator location of the scientific storage during the multiplication operation. FIG. 10 illustrates the multiplier and submultiple digit values stored in the Q register sections during the multiplication operation. It also stores the exponent values and is used in such calculations. As explained herein, the Q register is used in the generation of submultiples.

Reference will now be made to the flow chart of FIG. 11. The Figure illustrates diagrammatically the operations performed during various cycles of operation. The various abbreviations used and their significance are as follows:

1. S = sign;
2. M = mantissa;
3. X = exponent;
4. T = temporary register having address 0;
5. BI = input bus;
6. BO = output bus;
7. (A) = contents of location specified by the address is parentheses (i.e., A).

While the transfers of sign and exponent values are illustrated in flow chart 11, they are not described for ease of explaining the operation of the preferred embodiment of the present invention. Moreover, it will be noted that during the generation of the various submultiples, the sign and exponent values are binary ZEROS. Also, the various ALU, Q register sections, etc. will be referred to collectively as ALU, Q register, etc. for ease of explanation.

Figure 11:
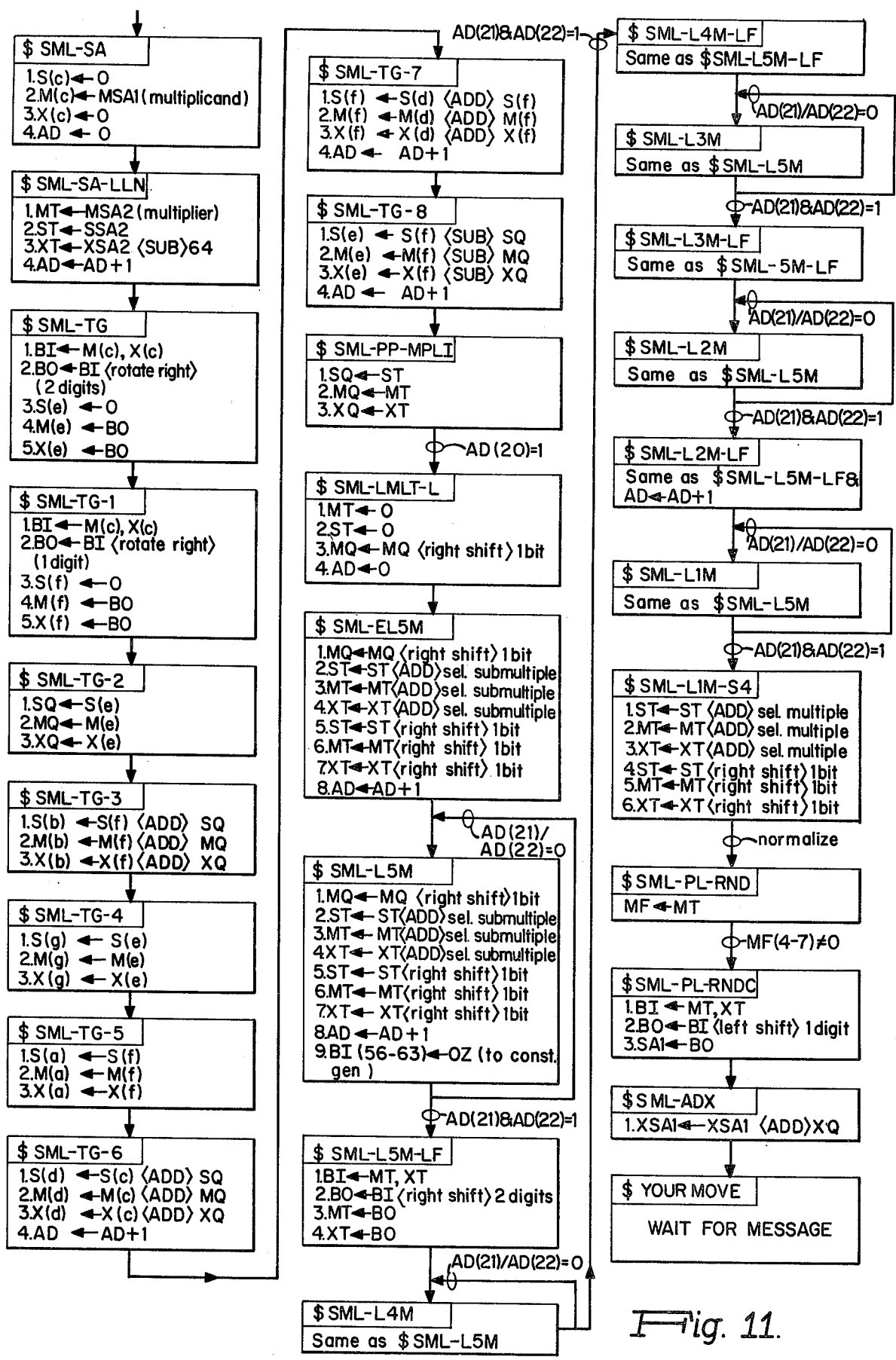
FIG. 11 is a flow chart used in conjunction with FIGS. 8 through 10 in explaining the operation of the present invention.

Now referring to the flow chart of FIG. 11, it is seen that the microprocessor section 40-8 of the SIP 40 under microprogram control performs the operations during a cycle of operation designated as $ SML-SA. That is, the 56 bit mantissa portion of the multiplicand stored in the temporary accumulator SA1 is addressed by the A address multiplier circuits 40-480 of FIG. 3 in response to the DA field (0001) of a first microinstruction word read out into register 40-62 of FIG. 2. Concurrently therewith, the location designated by address C (i.e., 1100) is addressed from the B address multiplexer circuits 40-482 in response to the NA field of the same microinstruction word.

The multiplicand mantissa portion is read out from the location having address 0001 into the A latches (i.e., latches 40-916 of FIG. 5). From there, it is transferred through the 2 input multiplexer circuits, the ALU sections and applied to one input of the 3 input multiplexer. Thereafter, the mantissa portion is written into the location having address 1100 (see FIG. 5). During this write operation, bit positions 56-63 of location having address 1100 are forced to ZEROS. This place a submultiple having a value of 1.00 times the multiplicand mantissa (i.e., 100 × the 56 bit multiplicand) into the 64 bit storage location having address C (see FIG. 8).

As indicated in FIG. 11, during the next cycle of operation, designated $ SMC-SA-LLN, the mantissa portion of the multiplier in location SA2 of FIG. 8 is transferred to the temporary accumulator location having address 0. Additionally, the value of $64_{10}$ is subtracted from the exponent of the multiplier and the result is stored in the temporary accumulator location. As previously mentioned, subtracting $64_{10}$ from the exponent ensures that the exponent of the product is in excess 64.

In greater detail, in response to a further microinstruction word, the DA field applies an address of 0010 to the A address multiplexer circuits 40-840 while the NA field applies an address of 0000 to the B address multiplexer circuits 40-842. This causes the multiplier mantissa and exponent values to be read out from accumulator SA1 into the A latches. From there, these values are transferred via the 2 input multiplexer circuits into the ALU sections.

Under microprogram control, the value $64_{10}$ is subtracted from the exponent value. The multiplier mantissa and modified exponent values are transferred from the ALU sections via the 3 input multiplexer circuits to the scientific storage and written into the temporary accumulator location. That is, the multiplier mantissa value is stored in bit positions 0-53 and the result of the exponent subtraction is stored in bit positions 54-63 of the temporary accumulator location.

The manner of performing the above mentioned subtraction can be considered as conventional. Since such operations not pertinent to an understanding of the present invention, they will not be described further therein.

The above operations are followed by a $ SML-TG cycle of operation wherein the contents of the location having address C are rotated right by 2 digit positions (i.e., 8 bits) to generate the submultiple equal to .01 times the multiplicand (i.e., 1 × the 56 bit multiplicand) which is temporarily stored in the location having address e. This value is used in generating the remaining submultiple values as explained herein.

In greater detail, in response to a further microinstruction word, the DA field applies an address of 1100 to the A multiplexer circuits 40-480 while the NA field applies an address of 1100 to the B address multiplexer circuits 40-482. This causes the contents of address C (1.00 times the multiplicand mantissa) to be read out into the A latches through the 2 input multiplexer circuits (e.g. 40-908), the ALU (e.g. 40-902), the output multiplexer (e.g. 40-904) into the shifter circuits 40-70a through 40-70d of FIG. 5.

Under control of the shift control field (SC) of the microinstruction word, the mantissa and exponent signals applied via the input bus BI are shifted right 8 bit positions (specified by the constant generator) and are applied to the output bus B0. Thereafter, the shifted mantissa and exponent signals are transferred via the 2 input multiplexer circuit (e.g. 40-908), the ALU (e.g. 40-902), the 3 input multiplexer (e.g. 40-920) and written into address e. The foregoing results in binary ZEROS in bit positions 0-7 of chips 40-802 and 40-804 and the multiplicand mantissa being stored in bit position 8-31 of chips 40-806 through 40-816 of FIG. 3. At this time, address e stores the value of .01 times the multiplicand mantissa (i.e., 1 times the multiplicand for a 56 bit mantissa).

As seen from FIG. 11, microporcessor section 40-8 of the SIP 40 next begins a $ SML-TG-1 cycle of operation. During this cycle, signals representative of the contents of address c (1.00 times the multiplicand mantissa) are rotated right by 1 digit and stored in address f. This places the value 0.10 times the multiplicand mantissa into address f. In greater detail, in response to a further microinstruction word, the DA field applies an address of 1100 to the A multiplexer circuits 40-480 while the NA field applies an address of 1111 to the B address multiplexer circuits 40-482. This causes the contents of address c to be read out into the shifter circuits 40-70a through 40-70d of FIG. 5. Under the control of the SC field, the mantissa and exponent signals are shifted right by 4 bit positions and written into address e. The transfers proceed as described in cycle $ SML-TG.

As seen from FIG. 11, the SIP 40 enters a $ SML-TG-2 cycle of operation wherein the microprocessor section 40-8 transfers signals representative of the contents of address e to the sections of the Q register (e.g. 40-922). In greater detail, in response to a further microinstruction word, the DA field applies an address of 1110 to the A address multiplexer circuits 40-480. This causes the contents of address e to be read out into the A latches. Thereafter, under microprogram control (i.e., signals applied to pin connections I0-I8), transferred through the 2 input multiplexer circuits (e.g. 40-908), ALU sections (e.g. 40-902), the 3 input Q multiplexer (e.g. 40-924) into the Q register sections (e.g. 40-922). This places the value 0.01 times the multiplicand mantissa in the Q register.

During the next cycle, $ SML-TG-3, the microprocessor section 40-8 of SIP 40 under microprogram control adds the contents of the Q register to the contents of address f and stores the result in address b. This completes the generation of the submultiple whose value is 0.11 times the multiplicand mantissa as shown in FIG. 8.

In greater detail, in response to a further microinstruction word, the DA field applies an address of 1111 to the A address multiplexer circuits 40-480 while the NA field applies an address of 1011 to the B address multiplexer circuits 40-842. This causes signals representative of the contents of address f to be read out into the A latches. Thereafter, under microprogram control, the microprocessor section 40-8 transfers such signals through the 2 input multiplexers and applies them to the R operand input terminals of the ALU. Concurrently therewith, signals representative of the contents of the Q register are applied via the 3 input multiplexer circuits to the S operand input terminals of the ALU sections. Under microprogram control, the ALU adds the operand signals and the result is transferred through the 3 input multiplexer circuits and written into address b. This places the value 0.11 times the multiplicand mantissa into address b which corresponds to that shown in FIG. 8.

As seen from FIG. 11, the SIP 40 enters a $ SML-TG-4 cycle of operation wherein the microprocessor section 40-8 transfers signals representative of the contents of address e into address 9. This completes the generation of the submultiple having a value of 0.01 times the multiplicand mantissa (1 times a 56 bit mantissa).

In greater detail, in response to a further microinstruction word, the DA field applies an address of 1110 to the A address multiplexer circuits 40-480 while the NA field applies an address of 1001 to the B address multiplexer circuits 40-482. Through the paths previously described, the microprocessor section 40-8 transfers the signals representative of the contents of address e into address 9. This places the value 0.01 times the multiplicand mantissa into address 9 which corresponds to that shown in FIG. 8.

Next, the SIP 40 enters a $ SML-TG-5 cycle of operation wherein the microprocessor section 40-8 transfer signals representative of the contents of address f into address a. This completes the generation of the submultiple having a value of 0.10 times the multiplicand mantissa (i.e., 10 times a 56 bit mantissa).

In greater detail, in response to a further microinstruction word, the DA field applies an address of 1111 to A address multiplexer circuits 40-480 while the NA field applies an address of 1010 to the B address multiplexer circuits 40-842. Through the paths previously described, the microprocessor section 40-8 tranfers the signals representative of the contents of address f into address a. This places the value of 0.10 times the multiplicand mantissa into address a which corresponds to that shown in FIG. 8.

The above cycle is followed by a $ SML-TG-6 cycle. During this cycle, the microprocessor section 40-8 adds the contents of the a register to the contents of address c and stores the result in address d. This completes the generation of the submultiple having a value of 1.01 times the multiplicand mantissa (i.e., 101 times a 56 bit mantissa).

In greater detail, in response to a further microninstruction word, the DA field applies an address of 1100 to the A address multiplexer circuits 40-480 while the NA field applies an address of 1101 to the B address multiplexer circuits 40-482. As described previously (e.g. cycle $ SML-TG-3), the ALU of the microprocessor section 40-8 under microprogram control adds the signals representative of the contents of address c applied to the R operand input terminals to the signals representative of the Q register contents applied to the S operand input terminals. Thereafter, the result is written into address d. This places the value 1.01 times the multiplicand mantissa into address d which corresponds to the value shown in FIG. 8.

Referring to FIG. 11, it is seen that microprocessor section 40-8 next performs a $ SML-TG-7 cycle. During this cycle, the contents of address d are added to the contents of address f and the result is written into address f. This completes the generation of the submultiple having a value of 1.11 times the multiplicand mantissa (i.e., 111 times a 56 bit mantissa).

In greater detail, in response to a next microinstruction word, the DA field applies an address of 1101 to the A address multiplexer circuits 40-480 while the NA field applies an address of 1111 to the B address multiplexer circuits 40-482.

As previously described, the above microinstruction word causes the ALU to add the signals representative of the contents of address c applied to the R operand input terminals to the signals representative of the contents of address f applied to the S operand input terminals. Thereafter, the result is written into address f. This places the value 1.11 times the multiplicand mantissa into address F which corresponds to the value shown in FIG. 8.

The microprocessor section 40-8 next enters a $ SML-TG-8 cycle during which it subtracts the contents of the Q register from signals representative of the contents of address f and stores the result in address e. This completes the generation of the submultiple having a value 1.10 times the multiplicand mantissa (i.e., 110 times a 56 bit mantissa) which completes the submultiple generation phase of the multiplication operation.

In greater detail, in response to a next microinstruction word, the DA field applies an address of 1111 to the A address multiplexer circuits 40-480 while the NA field applies an address of 1110 to the B address multiplexer circuits 40-482. Under microprogram control, the ALU is conditioned to subtract signals representative of the Q register contents applied to the S operand input terminals from signals representative of the contents of address f read out and applied to the R operand input terminals. Thereafter, the result is written into address e. This places the value 1.10 times the multiplicand mantissa into address e which corresponds to the value shown in FIG. 8.

The SIP 40 begins the execution phase of the multiplication operation by entering a $ SML-PP-MPLI cycle. During this cycle, the microprocessor section 40-8 transfers signals representative of the contents of the temporary accumulator to the Q register.

In greater detail, in response to a next microinstruction word, the DA field applies an address of 0000 to the A address multiplexer circuits 40-480. Under microprogram control signals corresponding to the initial contents of the temporary accumulator are transferred through the ALU, the 3 input Q multiplexer circuit and into the Q register. This places the multiplier mantissa and calculated exponent into the Q register. These values are shown in FIG. 10 for the cycle $ SML-PP-MPLI and correspond to the values shown as being stored in FIG. 9 during cycle $ SML-SA-LLN.

Next, the SIP 40 enters a $ SML-LMT-L cycle wherein the microprocessor section 40-8 sets the temporary accumulator mantissa bit positions to ZEROS and shifts the multiplier mantissa contents of the Q register right by one bit position. This clears the contents of the temporary accumulator in preparation for storing partial products and shifts the contents of the Q register one bit right. This applies the contents of Q register bit positions 47, 51, and 55 corresponding to a first multiplier digit to the A address multiplexer circuits 40-480.

In greater detail, in response to a next microinstruction word, the DA field applies an address of 0000 to the B multiplexer circuits 40-482. Under microprogram control, the microprocessor section 40-8 transfers the contents of the temporary accumulator into the B latches through the 3 input multiplexer circuit to the S operand input terminals of the ALU. Thereafter, under microprogram control, the contents are set to ZEROS, transferred through the 3 input multiplexer circuit and written back into the temporary accumulator. FIG. 9 illustrates the temporary accumulator contents which include a zero mantissa value and generated multiplier exponent following the completion of cycle $ SML-LMLT-L.

Additionally, under microprogram control, the multiplier mantissa stored in the Q register is applied to the 3 input Q multiplexer circuit which shifts the contents right by one bit and loads the result back into the Q register.

In FIG. 3, the resulting contents of Q register bit positions 47, 51 and 55 are applied to three input terminals of A address multiplexer circuits 40-480 and the fourth input terminal is forced to a binary ONE by bit 0 of the microinstruction word. The shifted contents of the Q register and the value of the submultiple digit applied to the A address multiplexer circuits 40-480 are as shown in FIG. 10. The selected multiplier digit value of 1000 causes the ZERO times the multiplicand to be read out from the corresponding address 1000.

Additionally, bit positions 20-22 of the address register 40-42 are forced to binary ZEROS. As previously mentioned, this register 40-42 is used to count a number of cycles of operation enabling exits following the completion of certain operations.

As seen from FIG. 11, the SIP 40 next enters a $ SML-EL5M cycle. In this cycle, the microprocessor section 40-8 transfers the submultiple shifted right by one bit to the temporary accumulator. Also, it shifts the exponent in the temporary accumulator right one bit, the Q register one bit and increments the address counter by one.

In greater detail, during this cycle, under microprogram control, the selected submultiple read out to the A latches is through the 2 input multiplexer circuit to the R operand input terminals while the ZERO contents of the temporary accumulator is applied to the S operand input terminal as specified by the DA field of a further microinstruction word. The ALU is conditioned by the microinstruction word to add the submultiple value (ZEROS) to the partial product value (ZEROS). The resulting partial product is transferred to the 3 input multiplexer circuit. Before being written into the temporary accumulator, the partial product contents are shifted right by one bit position via the 3 input multiplexer circuit (e.g. 40-920).

Concurrent therewith, under microprogram control, the microprocessor section 40-8 shifts the contents of the Q register right by one bit for selection of the next submultiple. Again, the shifting of the Q register contents proceeds via the 3 input Q multiplexer circuit. When so shifted, Q register bit positions 47, 51 and 55 apply the value 000 to the three input terminals of the A address multiplexer circuits 40-840 while the fourth input terminal is again forced to a binary ONE (see FIG. 10). The select submultiple digit value 1000 again causes the ZERO times the multiplicand submultiple to be read out from the corresponding address 1000.

Additionally, under microprogram control, the contents of register 40-42 is incremented by 1. This places bit positions 21 and 20 in a binary ONE and binary ZERO state respectively. During subsequent cycles of operation, the exponent value stored in the temporary accumulator will be shifted out. Since the processing of exponents is not pertinent to the understanding of the present invention, such shifting operations need not be further discussed herein.

As seen from FIG. 11, the SIP 40 then enters a $ SML-L5M cycle of operation. During this cycle, the microprocessor section 40-8 adds the selected submultiple to the partial product contents of the temporary accumulator and places the sum in the temporary accumulator shifted right one bit position. Also, the contents of the Q register are shifted right one bit position, the address counter is incremented by 1 and a value of 02 is applied to the constant generator chip 40-720 of FIG. 3 for selection of an appropriate shift count to be applied to the shifter circuits 40-70a through 40-70d during the next cycle $ SML-L5M-LF.

It will be noted from FIG. 11 that cycle $ SML-L5M is repeated until the address counter bit positions AD 21 and 22 store a count of 3 whereafter cycle $ SML-L5M-LF is entered.

Figure 10:
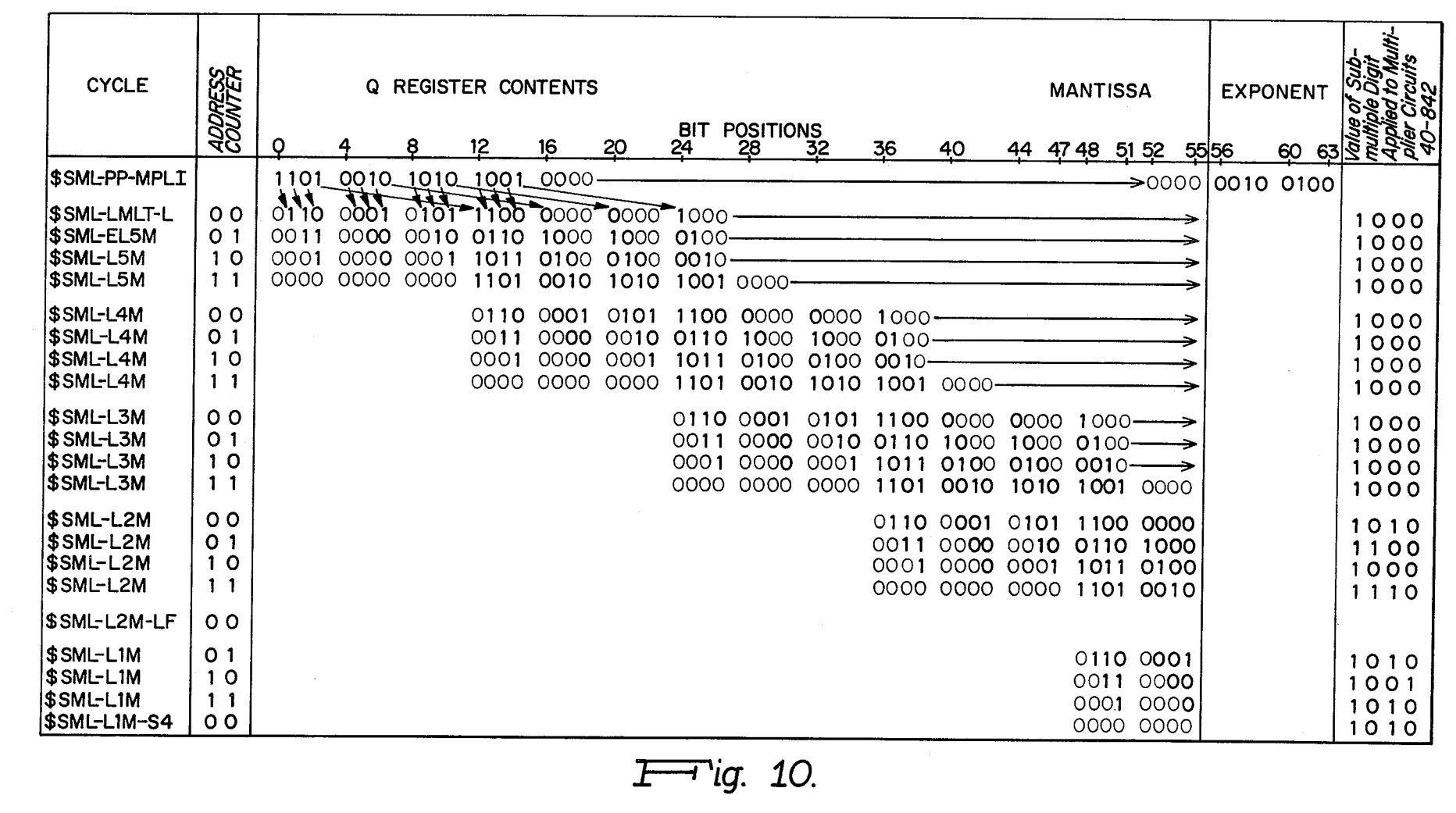

Considering the above in greater detail, it is seen from FIGS. 8 and 10 that the select submultiple digit value of 1000 again causes the ZERO times the multiplicand submultiple to be read out from the corresponding address 1000 into the A latches. From there the submultiple signals are applied to the R operand input terminals of the ALU. During this cycle under control of the DA field of a further microinstruction word, the partial product contents of the temporary accumulator are read out to the B latches and applied to the S operand input terminals of the ALU. The ALU adds the submultiple values (ZEROS) to the partial product value (ZEROS) and the result is transferred to the 3 input multiplexer circuit. Before being written into the temporary accumulator, the result is shifted one bit position right by the multiplexer circuit and written into address 0000.

Under microprogram control, the contents of the Q register are shifted by one bit via the 3 input Q multiplexer circuit for selection of the next submultiple. Following shifting, the Q register bit positions 47, 51 and 55 apply the value 000 to the A address multiplexer circuits 40-840 as illustrated in FIG. 10. Also, the address counter is incremented by 1.

As seen from FIG. 10, the cycle $ SML-5M is repeated with the same result (ZERO submultiple value and ZERO partial product value). These values are as shown in FIG. 10. At the end of this cycle, the address counter stores a count of 3 which causes the SIP 40 to begin cycle $SML-L5M-LF. As seen from FIG. 11, during this cycle, the SIP 40 under microprogram control shifts the contents of the temporary accumulator right 2 digits (8 bit positions) and stores the shifted contents back in the temporary accumulator. As seen from FIG. 9, the partial product mantissa value of the temporary accumulator is still all ZEROS while the exponent value had been shifted out and 12 multiplier bits have been processed.

In greater detail, during cycle $ SML-L5M-LF, the constant specifying an 8 bit shift read out from the ROM chip generator 40-720 is applied to the input terminals D0-D3 of each of the shifter circuits 40-70a through 40-70d. Under the control of another microinstruction word, the partial product contents read out into the A latches through the ALU and applied to the input terminals I0-I15 of each of the shifter circuits 40-70a through 40-70d are shifted right 2 digits. The result appearing at the output terminals O0-O15 of each of the shifter circuits 40-70a through 40-70d are transferred through the 2 input multiplexer circuit, the ALU, the 3 input multiplexer circuit and written into the temporary accumulator.

Referring to FIG. 11, it is seen that the SIP 40 begins a $ SML-L4M cycle of operation. For ease of explanation, this cycle as well as cycles $ SML-L4M, $ SML-L4M-LF, $ SML-L3M, $ SML-L3M-LF, $ SML-L2M, $ SML-L2M-LF and $ SML-L1M are shown in FIG. 11 as separate cycles. However, they merely repeat the operations described in connection with cycles $ SML-L5M and $ SML-L5M-LF. Therefore, it will be appreciated that the same sequencing can be accomplished by maintaining a count of how many times each of the two cycles are to be repeated.

As concerns the present example, it will be noted from FIGS. 9 and 10 that cycles that cycles $ SML-L4M, $ SML-L4M-LF, $ SML-L3M and $ SML-L3M-LF produce results identical to those produced during cycles $ SML-L5M and $ SML-L5M-LF (i.e., all ZERO submultiples and ZERO partial products stored in the temporary accumulator). Therefore, no further discussion of these cycles is necessary.

During the first $ SML-L2M cycle, the Q register bit positions 47, 51 and 55 apply the value 010 to the A address multiplexer circuits 40-840 as illustrated in FIG. 10. The select submultiple digit value of 1010 causes the 0.10 times the multiplicand submultiple to be read out from address 1010 which has the value indicated in FIG. 8. The selected submultiple is read into the A latches through the 2 input multiplexer circuit and applied to the S operand input terminals of the ALU. The ZERO partial product contents of the temporary accumulator are read into the B latches, through the 3 input multiplexer circuit and applied to the R operand input terminals of the ALU.

Under control of another microinstruction word, the ALU adds the selected submultiple to the ZERO partial product, shifts the sum right by one bit via the 3 input multiplexer circuit and stores the resulting value indicated in FIG. 9 into the temporary accumulator. Again, the Q register contents are shifted right by one bit for selection of the next submultiple and the address counter is incremented by 1 producing the values shown in FIG. 10.

During the next $ SML-L2M cycle, the Q register bit positions 47, 51 and 55 apply the value 100 to the A address multiplexer circuits 40-840 as shown in FIG. 10. The select submultiple digit value of 1100 causes the 1.00 times the multiplicand submultiple stored in address 1100 to be read out into the A latches through the 2 input multiplexer circuit and applied to the R operand input terminals of the ALU. Concurrent therewith, the partial product contents of the temporary accumulator are read out into the B latches through the 3 input multiplexer circuit and applied to the S operand input terminals of the ALU. Under microprogram control, the submultiple contents of address 1100 are added to the partial product contents, the result is shifted right by one bit via the 3 input multiplexer circuit and stored in the temporary accumulator. The stored value is as shown in FIG. 9. Again, the contents of the Q register are shifted right by one bit for selection of the next submultiple and the address counter is incremented by 1. The resulting values are as shown in FIG. 10.

During the next $ SML-L2M cycle, the ZERO times the multiplicand submultiple is selected by the select submultiple digit 1000. This results in the partial product being shifted right by one bit and stored in the temporary accumulator as shown in FIG. 9. Again, the contents of the Q register are shifted right by one bit and the address counter is incremented by 1. The resulting values are as shown in FIG. 10.

During the last $ SML-L2M cycle, the 1.10 times the multiplicand submultiple is selected by the select submultiple digit 1110. In the manner previously described, this submultiple is added to the partial product contents of the temporary accumulator, the sum is shifted right by one bit and placed in the temporary accumulator. The result is as shown in FIG. 9. Again, the contents of the Q register are shifted right by one bit and the address counter is incremented by 1 to a count of 3 as shown in FIG. 10. During this cycle, a digit value of 02 is applied to the constant generator chip 40-720.

As seen from FIG. 11, the SIP 40 begins a $ SML-L2M-LF cycle of operation wherein it shifts right the contents of the temporary accumulator the number of bit positions specified by the constant read out of the generator chip 40-720. Again, this constant specifies an 8 bit shift. Additionally, the address counter is incremented by one.

In greater detail, in response to a further microinstruction word, the partial product contents of the temporary accumulator is read out into the B latches, through the 3 input multiplexer circuit, the ALU, the output multiplexer circuit to the input terminals I0-I15 of the multidigit shifter circuits 40-70a through 40-70d. The shifted partial product appearing at the output terminals O0-O15 of the shifter circuits 40-70a through 40-70d is transferred through the 2 input multiplexer circuit, the ALU and 3 input multiplexer circuit into the temporary accumulator. The partial product result is as shown in FIG. 9. Also, under microprogram control, the contents of the address counter is incremented by 1.

In a similar manner, the SIP 40 next performs a series of $ SML-L1M cycles wherein under microprogram control, the microprocessor section 40-8 adds the submultiples selected by the values 1010, 1001, 1010 and 1010 as indicated in FIG. 10. More specifically, during a first $ SML-L1M cycle, the select submultiple digit value of 1010 causes the 0.10 times the multiplicand submultiple stored in address 1010 to be added to the partial product stored in the temporary accumulator. The sum is shifted right one bit and the result shown in FIG. 9 is returned to the temporary accumulator. The contents of the Q register is shifted right by 1 and the address counter is incremented by 1 producing the values indicated in FIG. 10.

During the second $ SML-L1M cycle, the select submultiple digit value of 1001 cauese the 0.01 times the multiplicand submultiple to be added to the partial product stored in the temporary accumulator. The resulting partial product, and Q register contents are shifted right by 1 and the address counter is incremented by 1 producing the values indicated in FIGS. 9 and 10. During the last or third $ SML-L1M cycle, the select submultiple digit value of 1010 again causes the 0.10 times the multiplicand submultiple to be read out for addition to the partial product stored in the temporary accumulator which after being shifted right by one bit producing the values shown in FIG. 9. Again, the Q register contents are shifted right by one and the address counter is incremented by 1 producing the values shown in FIG. 10.

As seen from FIG. 11, the SIP 40 next begins a $ SML-L1M-S4 cycle of operation wherein the last submultiple selected by another digit value of 1010 is added to the partial product stored in the temporary accumulator and the result is shifted right by one bit and stored in the temporary accumulator. This completes the processing of the entire 56 bits of the multiplier mantissa. It will be noted that 60 bits are actually processed. However, during the last four cycles, one of the three bits (least significant bit) is a binary ZERO resulting from shifting binary ZEROS into the Q register. It is seen that the temporary accumulator stores the final result of the multiplication operation indicated in FIG. 9.

The next cycle is a $ SML-PL-RND cycle during which the SIP 40 transfers signals corresponding to the mantissa value to the function register 40-40 for testing the values of bits 4-7. Assuming these bits do not equal ZERO, the SIP 40 enters a $ SML-PL-RND cycle. During this cycle, the microprocessor section 40-8 reads out the final product contents of the temporary accumulator, shifts it left one digit (i.e., 4 bit positions) and stores the result in SA1 as indicated in FIG. 8. Thus, SA1 now stores the value 50B23B31EB0000 F0. The read out and shifting operations are accomplished under microprogram control in the manner previously described.

The above cycle is followed by a $ SML-ADX cycle wherein the microprocessor section 40-8 adds the exponent value in the Q register to the exponent value of the multiplicand stored in SA1 and places the result in SA1. The actual exponent value is 7 bits long and occupies bit positions 56 through 62. However, a binary ZERO is inserted into bit position 63.

The values and results are as follows:

|  | BINARY | 0 added to bit 63 | Excess 64 |
|---|---|---|---|
| $26_{16}$ | 010 0110 | $4C_{16}$ 0100 1100 | CC 1100 1100 |
| $12_{16}$ | 001 0010 | $28_{16}$ 0010 0100 | A4 1010 0100 |
| $38_{16}$ | 011 1000 | 0111 0000 | F0 1111 0000 |

It will be noted that the three exponent additions shown above are equivalent. The addition of the Q register exponent value of 00100100 to the SA1 exponent value of 11001100 produces the result of 11110000 or F0 which is stored as the final product in the temporary accumulator as shown in FIG. 8.

It will be appreciated that these exponent additions as well as the previous calculations can be considered as being carried out in a conventional fashion utilizing the 64 bit positions of the Q register and the temporary accumulator locations. The previous described exponent operations as well as the submultiple operations are carried out in a similar fashion.

Next, the SIP 40 enters a $ YOURMOVE cycle when it signals the CPU 20 that it has finished the multiplication operation.

From the foregoing, it is seen how the apparatus of the present invention is able to carry out expeditiously a multiplication operation. By utilizing the least significant bit from the least significant three successive hexidecimal digits, the arrangement of the present invention is able to minimize the amount and number of shift operations. That is, only a shift of one bit of the multiplier digits is required for selection of a next submultiple.

While the present invention has been illustrated in terms of processing three bits at a time, it will be appreciated that it can be used to process a greater number of bits at a time. The number of bits will depend upon the amount of memory storage locations available. For example, 4 bits at a time require 16 submultiple addresses while n bits at a time requires $2^n$ submultiple addresses.

It will be appreciated that the convention used in allocating chip bit positions in the preferred embodiment of the present invention is one wherein the most significant bit position is designated "0" (Q0, F0) while the least significant bit position is designated "3" (Q3, F3). The manufacturers of microprocessor chips may use different conventions in describing their chips resulting in alterations of specific pin connections when connected in the preferred embodiment. For example, the manufacturer, Advanced Micro Devices Inc. utilizes a convention opposite to that described in connection with the preferred embodiment. Hence, the Q0, Q3 and F0, F3 pins would be interchanged when using such chips in the preferred embodiment.

It will be appreciated by those skilled in the art that many changes may be made to the preferred embodiment of the present invention. For example, the microprocessor of the present invention may be implemented with other chips such as AMD2901A also manufactured by Advanced Micro Devices Inc. and the MMI6701 manufactured by Monolithic Memories Inc. It will also be appreciated that such chips may be constructed using different technologies, CML, $I^2L$, etc.

To prevent undue burdening the description with matter within the ken of those skilled in the art, a block diagram approach has been followed, with a detailed functional description of each block and specific identification of the circuitry it represents. The individual engineer is free to select elements and components such as flip-flop circuits, shift registers, etc., from his own background or from available standard references, such as "Arithmetic Operations in Digital Computers" by R. K. Richards (Van Nostrand Publishing Company), Computer Design Fundamentals by Chu (McGraw-Hill Book Company, Inc.), and Pulse, Digital and Switching Waveforms by Millman and Taub (McGraw-Hill Book Company, Inc.).

While in accordance with the provisions and statute, there has been illustrated and described the best form of the invention known, certain changes may be made to the system described without departing from the spirit of the invention as set forth in the appended claims and that in some cases, certain features of the invention may be used to advantage without a corresponding use of other features.

What is claimed is:

1. An apparatus for multiplying a multiplicand by the selection of submultiples of said multiplicand in accordance with the bits of a multiplier, said apparatus comprising:

a number of multibit processor chips connected to operate in tandum, each chip having a number of terminals and including;

an arithmetic logic unit section, a multibit addressable random access memory section connected to said arithmetic logic unit section, each said memory section having a plurality of multibit storage locations, a group of said locations storing a number of different predetermined submultiple digits of said multiplicand having values selected to have a predetermined relationship to the values of bits of said multiplier used in selecting said submultiples and another location for storing a partial product value, a multibit position shift register section for storing said multiplier coupled to said arithmetic and logic unit section, a most significant bit position and a least significant bit position of each said multibit position shift register section connected to first and second ones of said number of terminals;

first conductor means connecting said second terminal of different ones of said chips to the first terminal of an alternate succeeding chip so as to enable a multidigit shifting of the multiplier digit contents of said shift register sections during a cycle of operation; and, submultiple selection circuit means having a number of input terminals connected to receive selection signals from a number of said second terminals of predetermined ones of said number of chips storing a group of successive multiplier digits and output terminals connected to each said addressable random access memory section, said selection signals conditioning each of said memory sections for read out of the digits of a next submultiple of said multiplicand upon the shifting of said multiplier digit contents of said shift register sections in a predetermined direction by one bit position for summing to said partial product value stored in said another location of said memory sections by said arithmetic and logic sections for producing an output partial product generated from simultaneously processing several bits of said multiplier during said cycle of operation.

2. The apparatus of claim 1 wherein each said chip further includes a multibit input shift multiplexer section connected to third and fourth ones of said number of terminals and said apparatus further includes second conductor means connecting said third and fourth terminals of each of said chips to the fourth and third terminals respectively of a next succeeding and a preceding one of said chips for enabling the shifting of said output partial product by one bit position in said predetermined direction during said cycle of operation.

3. The apparatus of claim 2 wherein said predetermined direction is from left to right corresponding to a shifting from the most significant bit position to the least significant bit position.

4. The apparatus of claim 3 wherein said predetermined relationship between the values of said submultiples and multiplier selection bits is having said submultiple values including multiples of the numerical values of the least significant bit positions of each of the three least significant digits of said multiplier.

5. The apparatus of claim 4 wherein said least significant bit positions of said three least significant digits are selected to have values corresponding to 1 times, 10 times and 100 times the value of said multiplicand.

6. The apparatus of claim 5 wherein said different predetermined submultiples selected to be stored in said number of said location of said memory sections have values corresponding to 0, 1, 10, 11, 100, 110 and 111 times said multiplicand.

7. The apparatus of claim 6 wherein said multiplicand and multiplier, each includes a mantissa portion including a plurality of binary coded digits, said memory sections of said number chips storing said different predetermined submultiple digits of said mantissa portion of said multiplicand and wherein certain ones of said number of input terminals of said submultiple selection circuits means are connected in a predetermined manner to said fourth terminal of each of the chips storing the last three least significant multiplier digits in said multibit position shift register section included therein.

8. The apparatus of claim 7 wherein said mantissa portion has a first predetermined number of bits and wherein all of said multibit memory sections of said first group of said number of chips have a second predetermined number of bits larger in magnitude than said first predetermined number of bits, said different predetermined submultiples when stored in said number of said locations of said first group of said memory sections having values corresponding to 0, 0.01, 0.10, 0.11, 1, 1.01, 1.10 and 1.11 times said mantissa portion of said multiplicand.

9. The apparatus of claim 8 further including microprogram control means for generating a series of microinstruction control signals and each of said number of multibit processor chips further including a number of control input terminals connected to receive different ones of said microinstruction control signals, each said multibit position shift register section being conditioned by first ones of said microinstruction control signals to shift said multiplier digit contents by one bit position, each said memory section being conditioned by second ones of said microinstruction control signals to read out to said arithmetic and logic unit section a digit of a next submultiple specified by said selection signals and each said arithmetic logic unit section being conditioned by third ones of said microinstruction control signals to sum said next submultiple digit to a corresponding digit of said partial product for simultaneous processing of said several multiplier bits during said cycle of operation.

10. The apparatus of claim 9 wherein said submultiple selection circuit means further includes:
  first multiplexer circuit, said first multiplexer circuit having a number of input terminals corresponding to said number of input terminals wherein a first input terminal is connected to receive one of said series of microinstruction control signals, second, third and fourth ones of said input terminals are connected to receive signals corresponding to said least significant bits of said most significant, next most significant and least significant digits respectively of said last three least multiplier digits and said first multiplexer circuit having a number of output terminals connected to each said addressable random access memory section for read out of said submultiples therefrom; and,
  a second multiplexer circuit having a number of input terminals connected to receive a number of said series of microinstruction control signals and a number of output terminals connected to each said addressable random access memory section for read out of the contents of any one of said plurality of storage locations.

11. The apparatus of claim 9 wherein said number of terminals of each chip further includes:
  a group of data input terminals operatively connected to said arithmetic and logic unit section associated therewith and
  a group of data output terminals operatively connected to said associated arithmetic and logic unit section; and
  said apparatus further including multidigit shifter means, said shifter meand including:
    a number of input terminals, each input terminal being connected to a different one of said group of data output terminals of said each chip;
    a corresponding number of output terminals, each output terminal being connected to a different one of said group of data input terminals of said each chip; and
    a number of control input terminals connected to said microprogram control means, said microprogram control means being operative to generate another series of microinstruction control signals, each of the memory sections being conditioned by ones of said another series of microinstruction control signals to read out the digits of said multiplicand mantissa portion from an initial location, each said arithmetic and logic unit section being conditioned by ones of said another series of microinstruction control signals to apply said digits of said multiplicand mantissa to said input terminals of said multidigit shifter means and said shifter means being conditioned by other ones of said series of microinstruction control signals applied to said control input terminals to shift said multiplicand mantissa digits by a specified number of digits with resulting shifted digits being applied at said output terminals of said shifter means thereby enabling the generation of digits of said number of different predetermined submultiple digits required for multiplying said multiplicand by said multiplier.

12. The apparatus of claim 11 further including constant generator means, having input terminals and output terminals, said input terminals of said generator means being connected to receive certain ones of said microinstruction control signals and said output terminals of said generator means being connected to a number of said control input terminals of said shifter means, said constant generator means being operative in response to said microinstruction control signals to apply signals representative of a shift count constant for causing the shifting of said multiplicand mantissa digits by said specified number of digits.

13. The apparatus of claim 11 wherein each said multibit position shift register section and memory section are conditioned by certain ones of said another series of microinstruction control signals to store predetermined one of said shifted digits of submultiples applied to said data input terminals and said each arithmetic and logic unit section being conditioned by other ones of said another series of microinstruction control signals to sum said submultiple digit stored in said shift register section and said memory section for generating other ones of said number of different predetermined submultiple digits.

14. The apparatus of claim 2 wherein each chip further includes a number of control input terminals and wherein said apparatus further includes multidigit shifter means, said shifter means having a number of control input terminals, a number of input terminals and a number of output terminals, said input terminals and said output terminals of said shifter means being connected to first and second groups of said number of terminals of said each chip; and, microprogram control means for generating sequences of microinstruction control signals, said control means being connected to said number of control input terminals of each chip and to said control input terminals of said shifter means, said microprogram control means being operative upon completion of a predetermined number of bit shifts of said multiplier digits during a corresponding number of said cycles of operation to apply signals to said shifter means for shifting said partial product by a predetermined number of bits enabling the simultaneous processing of a next number of groups of said several bits of said multiplier.

15. The apparatus of claim 14 wherein said predetermined number of bit shifts equals 4, said predetermined direction is to the right, said predetermined number of bits equals 8 and said next number of groups equals 3.

16. An apparatus for multiplying a multiplicand by the selection of submultiples of said multiplicand in accordance with the bits of a multiplier, said apparatus comprising:

a number of multibit processor chips connected to operate in tandum each chip having a number of terminals and including:

an arithmetic logic unit section;

a multibit addressable random access memory section connected to said arithmetic logic unit section, each said memory section having a plurality of multibit storage locations, a group of said locations storing a number of different predetermined submultiple digits of said multiplicand having values selected to have a predetermined relationship to the values of bits of said multiplier used in selecting said submultiples and another location for storing a partial product value;

a multibit position shift register section for storing said multiplier, coupled to said arithmetic and logic unit section, a most significant bit position and a least significant bit position of each said multibit position shift register section connected to first and second ones of said number of terminals; and, a multibit input shift section connected to said memory section, to said arithmetic logic unit section and to third and fourth ones of said number of terminals;

first conductor means connecting said second terminal of different ones of said chips to the first terminal of an alternate succeeding chip so as to enable a multidigit shifting of the multiplier digit contents of said shift register sections during a cycle of operation;

second conductor means connecting said third and fourth terminals of each chip to said fourth and said third terminals respectively of a next succeeding and the preceding one of said chips for enabling the shifting by one bit position signals to be stored in said memory section;

submultiple selection circuit means having a number of input terminals connected to receive selection signals from a number of said second terminals of predetermined ones of said number of chips storing a group of successive multiplier digits and output terminals connected to each said addressable random access memory section, said selection signals conditioning each of said memory sections for read out of the digits of a next submultiple of said multiplicand upon the shifting of said multiplier digit contents of said shift register sections in a predetermined direction by one bit position for summing to said partial product value stored in said another location of said memory sections by said arithmetic and logic sections for producing an output partial product generated from simultaneously processing several bits of said multiplier during said cycle of operation and each of said multibit input shift sections shifting said digits of said output partial product by one bit position during said cycle of operation before storage in said another location for a next cycle of operation.

17. The apparatus of claim 16 wherein each chip further includes a number of control terminals and wherein said apparatus further includes multidigit shifter means, said shifter means having a number of control input terminals, a number of input terminals and a number of output terminals, said input terminals and said output terminals of said shifter means being connected to first and second groups of said number of terminals of said each chip; and, microprogram control means for generating sequences of microinstruction control signals, said control means being connected to said number of control input terminals of each chip and to said control input terminals of said shifter means, said microprogram control means being operative upon completion of a predetermined number of bit shifts of said multiplier digits during a corresponding number of said cycles of operation to apply signals to said shifter means for shifting said output partial product by a predetermined number of bits enabling the simultaneous processing of a next number of groups of said several bits of said multiplier.

18. The apparatus of claim 17 wherein said predetermined number of bit shifts equals 4, said predetermined direction is to the right, said predetermined number of bits equals 8 and said next number of groups equals 3.

19. The apparatus of claim 16 wherein said predetermined direction is from left to right corresponding to a shifting from the most significant bit position to the least significant bit position.

20. The apparatus of claim 19 wherein said predetermined relationship between the values of said submultiples and multiplier selection bits is having said submultiple values include multiples of the numerical values of the least significant bit positions of each of the three least significant digits of said multiplier.

21. The apparatus of claim 19 wherein said least significant bit positions of said three least significant digits are selected to have values corresponding to 1 times, 10 times and 100 times the value of said multiplicand and wherein said different predetermined submultiples selected to be stored in said number of said location of said memory sections have values corresponding to 0, 1, 10, 11, 100, 110 and 111 times said multiplicand.

22. The apparatus of claim 21 wherein said multiplicand and multiplier, each includes a mantissa portion including a plurality of binary coded digits, said memory sections of said number chips storing said different predetermined submultiple digits of said mantissa portion of said multiplicand and wherein certain ones of said number of input terminals of said submultiple selection circuit means are connected in a predetermined manner to said fourth terminal of each of the chips storing the last three least significant multiplier digits in said multibit position shift register section included therein.

23. The apparatus of claim 22 wherein said mantissa portion has a first predetermined number of bits and wherein all of said multibit memory sections of said first group of said number of chips have a second predetermined number of bits larger in magnitude than said first predetermined number of bits, said different predetermined submultiples when stored in said number of said locations of said first group of said memory sections having values corresponding to 0, 0.01, 0.10, 0.11, 1, 1.01, 1.10 and 1.11 times said mantissa portion of said multiplicand.

24. The apparatus of claim 22 further including:

microprogram control means for generating a series of microinstruction control signals and each of said number of multibit processor chips further including a number of control input terminals connected to receive different ones of said microinstruction control signals; and wherein said submultiple selection circuit means further includes:

first multiplexer circuit, said first multiplexer circuit having a number of input terminals corresponding to said number of input terminals wherein a first input terminal is connected to receive one of said microinstruction control signals, second, third and fourth ones of said input terminals are connected to receive signals corresponding to said least significant bits of said most significant, next most significant and least significant digits respectively of said last three least multiplier digits and said first multiplexer circuit having a number of output terminals connected to each said addressable random access memory section for read out of said submultiples therefrom; and, a second multiplexer circuit having a number of input terminals connected to receive a number of said microinstruction control signals and a number of output terminals connected to each said addressable random access memory section for read out of the contents of any one of said plurality of storage locations; and, each said multibit position shift register section being conditioned by first ones of said microinstruction control signals to shift said multiplier digit contents by one bit position, each said memory section being conditioned by second ones of said microinstruction control signals to read out to said arithmetic and logic unit section a digit of a next submultiple specified by said selection signals from said first multiplexer circuit and each said arithmetic logic unit section being conditioned by third ones of said microinstruction control signals to sum said next submultiple digit to a corresponding digit of said partial product read out in response to signals applied by said second multiplexer circuit for said simultaneous processing of said several multiplier bits during said multiplying.

25. The apparatus of claim 24 wherein said number of terminals of each chip further includes:

a group of data input terminals operatively connected to said arithmetic and logic unit section associated therewith and a group of data output terminals operatively connected to said associated arithmetic and logic unit section; and said apparatus further including multidigit shifter means, said shifter means including:

a number of input terminals, each input terminal being connected to a different one of said group of data output terminals of said each chip;

a corresponding number of output terminals, each output terminal being connected to a different one of said group of data input terminals of said each chip; and a number of control input terminals connected to said microprogram control means, said microprogram control means being operative to generate another series of microinstruction control signals, each of the memory sections being conditioned by ones of said another series of microinstruction control signals to read out the digits of said multiplicand mantissa portion from an initial location, each said arithmetic and logic unit section being conditioned by ones of said another series of microinstruction control signals to apply said digits of said multiplicand mantissa to said input terminals of said multidigit shifter means and said shifter means being conditioned by other ones of said series of microinstruction control signals applied to said control input terminals to shift said multiplicand mantissa digits by a specified number of digits with resulting shifted digits being applied at said output terminals of said shifter means thereby enabling the generation of digits of said number of different predetermined submultiple digits required for multiplying said multiplicand by said multiplier.

26. An apparatus for multiplying a multiplicand by the selection of submultiples of said multiplicand in accordance with the bits of a multiplier, said apparatus comprising:
  a number of multibit microprocessor chips connected to operate in tandum, each chip having a number of terminals and including:
    an arithmetic logic unit section having first and second sets of input terminals for receiving first and second operands respectively;
    a multibit addressable random access memory section connected to said arithmetic logic unit section, each said memory section having a plurality of digit storage locations, a group of said locations storing a number of different predetermined digits of submultiples of said multiplicand having values selected to have a predetermined relationship to the values of bits of said multiplier used in selecting said submultiples and another location for storing a partial product value;
    a multibit position shift register section for storing said multiplier, a most significant bit position and a least significant bit position of each said multibit position shift register section connected to first and second ones of said number of terminals;
    a multibit random access memory shift and multiplexer section connected to said random access memory section and to third and fourth ones of said number of terminals; and,
    an input multiplexer section connected to said arithmetic logic unit section, to said shift register section and to said first and second ones of said number of terminals;
  first conductor means connecting said second terminal of different ones of said chips to the first terminal of an alternate third chip so as to enable multidigit shifting of the multiplier digit contents of said shift register sections during a cycle of operation;
  submultiple selection circuit means having a number of input terminals connected to receive selection signals from a number of said second terminals of predetermined ones of said number of chips storing a group of successive multiplier digits and output terminals connected to each said addressable random access memory section, said selection signals conditioning each of said memory sections for read out of the digits of a next submultiple of said multiplicand to said first set of input terminals of said arithmetic logic unit section upon the shifting of said multiplier digit contents of said shift register sections in a predetermined direction by one bit position by said input multiplexer section for summing to said partial product value read out from said another location of said memory sections to said second set of input terminals of said arithmetic logic unit section by said arithmetic and logic sections for producing an output partial product generated from simultaneously processing several bits of said multiplier during said cycle of operation and each of said multibit random access memory shift and multiplexer sections shifting said digits of said output partial product by one bit position during said cycle of operation before storage in said another location for a next cycle of operation.

27. The apparatus of claim 26 wherein each microprocessor chip further includes a number of control input terminals and wherein said apparatus further includes multidigit shifter means, said shifter means having a number of control input terminals, a number of input terminals and a number of output terminals, said input terminals and said output terminals of said shifter means being connected to first and second groups of said number of terminals of said each chip; and,
  microprogram control means for generating sequences of microinstruction control signals, said control means being connected to said number of control input terminals of each chip and to said control input terminals of said shifter means, said microprogram control means being operative upon completion of a predetermined number of bit shifts of said multiplier digits during a corresponding number of said cycles of operation to apply signals to said shifter means for shifting said output partial product by a predetermined number of bits enabling the simultaneous processing of a next number of groups of said several bits of said multiplier.

28. The apparatus of claim 27 wherein said predetermined number of bit shifts equals 4, said predetermined direction is to the right, said predetermined number of bits equals 8 and said next number of groups equals 3.

29. The apparatus of claim 26 wherein said predetermined direction is from left to right corresponding to a shifting from the most significant bit position to the least significant bit position.

30. The apparatus of claim 29 wherein said predetermined relationship between the values of said submultiples and multiplier selection bits is having said submultiple values including multiples of the numerical values of the least significant bit positions of each of the three least significant digits of said multiplier and
  wherein said least significant bit positions of said three least significant digits are selected to have values corresponding to 1 times, 10 times and 100 times the value of said multiplicand.

31. The apparatus of claim 30 wherein said different predetermined submultiples selected to be stored in said number of said location of said memory sections have values corresponding to 0, 1, 10, 11, 100, 110 and 111 times said multiplicand.

32. The apparatus of claim 31 wherein said multiplicand and multiplier, each includes a mantissa portion including a plurality of binary coded digits, said memory sections of a first group of said number of chips storing said different predetermined submultiple digits of said mantissa portion of said multiplicand and wherein certain ones of said number of input terminals of said submultiple selection circuit means are connected in a predetermined manner to said fourth terminal of each of the chips storing the last three significant multiplier digits in said multibit position shift register section included therein.

33. The apparatus of claim 32 wherein said mantissa portion has a first predetermined number of bits and wherein all of said multibit memory sections of said first group of said number of chips have a second predetermined number of bits larger in magnitude than said first predetermined number of bits, said different predetermined submultiples when stored in said number of said locations of said first group of said memory sections having values corresponding to 0, 0.01, 0.10, 0.11, 1, 1.01, 1.10 and 1.11 times said mantissa portion of said multiplicand.

34. The apparatus of claim 33 further including:
microprogram control means for generating a series of microinstruction control signals and each of said number of multibit processor chips further including a number of control input terminals connected to receive different ones of said series of microinstruction control signals; and wherein said submultiple selection circuit means further includes:
first multiplexer circuit, said first multiplexer circuit having a number of input terminals corresponding to said number of input terminals wherein a first input terminal is connected to receive one of said microinstruction control signals, second, third and fourth ones of said input terminals are connected to receive signals corresponding to said least significant and least significant digits respectively of said last three least multiplier digits and said first multiplexer circuit having a number of output terminals connected to each said addressable random access memory section for read out of said submultiples therefrom; and,
a second multiplexer circuit having a number of input terminals connected to receive a number of said microinstruction control signals and a number of output terminals connected to each said addressable random access memory section for read out of the contents of any one of said plurality of storage locations; and,
each said multibit position shift register section being conditioned by first ones of said series of microinstruction control signals to shift said multiplier digit contents by one bit position, each said memory section being conditioned by second ones of said series of microinstruction control signals to read out to said arithmetic and logic unit section a digit of a next submultiple specified by said selection signals from said first multiplexer circuit and each said arithmetic logic unit section being conditioned by third ones of said microinstruction control signals to sum said next submultiple digit to a corresponding digit of said partial product read out in response to signals applied by said second mutliplexer circuit for said simultaneous processing of said several multiplier bits during said multiplying.

35. The apparatus of claim 34 wherein said number of terminals of each microprocessor chip further includes:
a group of data input terminals operatively connected to said arithmetic and logic unit section associated therewith and
a group of data output terminals operatively connected to said associated arithmetic and logic unit section; and
said apparatus further including multidigit shifter means, said shifter means including:
a number of input terminals each input terminal being connected to a different one of said group of data output terminals of said each chip;
a corresponding number of output terminals, each output terminal being connected to a different one of said group of data input terminals of said each chip; and
a number of control input terminals connected to said microprogram control means, said microprogram control means being operative to generate another series of microinstruction control signals, each of the memory sections being conditioned by ones of said another series of microinstruction control signals to read out the digits of said multiplicand mantissa portion from an initial location, each said arithmetic and logic unit section being conditioned by ones of said another series of microinstruction control signals to apply said digits of said multiplicand mantissa to said input terminals of said multidigit shifter means and said shifter means being conditioned by other ones of said series of microinstruction control signals applied to said control input terminals to shift said multiplicand mantissa digits by a specified number of digits with resulting shifted digits being applied at said output terminals of said shifter means thereby enabling the generation of digits of said number of different predetermined submultiple digits required for multiplying said multiplicand by said multiplier.

36. The apparatus of claim 35 wherein each said multibit position shift register section and memory section are conditioned by certain ones of said another series of microinstruction control signals to store predetermined one of said shifted digits of submultiples applied to said data input terminals and said each arithmetic and logic unit section being conditioned by other ones of said another series of microinstruction control signals to sum said submultiple digit stored in said shift register section and said memory section for generating other ones of said number of different predetermined submultiple digits.

* * * * *